(12) United States Patent
Kondo et al.

(10) Patent No.: US 7,787,750 B2
(45) Date of Patent: Aug. 31, 2010

(54) INFORMATION RECORDING/REPRODUCTION APPARATUS AND RECORDING SYSTEM THEREOF

(75) Inventors: Hiroyuki Kondo, Kyoto (JP); Kojiro Kawasaki, Katano (JP)

(73) Assignee: Panasonic Corporation, Osaka (JP)

( * ) Notice: Subject to any disclaimer, the term of this patent is extended or adjusted under 35 U.S.C. 154(b) by 1146 days.

(21) Appl. No.: 10/521,751

(22) PCT Filed: Mar. 31, 2004

(86) PCT No.: PCT/JP2004/004644

§ 371 (c)(1),
(2), (4) Date: Jan. 19, 2005

(87) PCT Pub. No.: WO2004/088980

PCT Pub. Date: Oct. 14, 2004

(65) Prior Publication Data

US 2005/0251829 A1   Nov. 10, 2005

(30) Foreign Application Priority Data

Mar. 31, 2003 (JP) .............................. 2003-096176

(51) Int. Cl.
*H04N 5/91* (2006.01)
*H04N 7/00* (2006.01)
(52) U.S. Cl. .......................................... 386/83; 386/46
(58) Field of Classification Search ...................... 386/1, 386/46, 83; 725/39, 40, 46, 58, 142
See application file for complete search history.

(56) References Cited

U.S. PATENT DOCUMENTS

| | | | |
|---|---|---|---|
| 5,850,218 A * | 12/1998 | LaJoie et al. .................. 725/45 |
| 6,498,895 B2 * | 12/2002 | Young et al. ................... 386/83 |
| 6,532,589 B1 * | 3/2003 | Proehl et al. ................... 725/40 |
| 7,134,136 B2 * | 11/2006 | Hanai et al. ................... 725/142 |
| 7,188,356 B1 * | 3/2007 | Miura et al. ................... 725/46 |
| 7,212,725 B2 * | 5/2007 | Gunji et al. ................... 386/46 |
| 7,218,839 B2 * | 5/2007 | Plourde et al. ................ 386/83 |
| 7,224,886 B2 * | 5/2007 | Akamatsu et al. ............. 386/83 |
| 7,356,246 B1 * | 4/2008 | Kobb ........................... 386/83 |

(Continued)

FOREIGN PATENT DOCUMENTS

EP    1 193 968    4/2002

(Continued)

OTHER PUBLICATIONS

Supplementary European Search Report dated Mar. 18, 2010 issued in corresponding EP Application No. 04 72 4750.

*Primary Examiner*—Marsha D Banks Harold
*Assistant Examiner*—Marc Dazenski
(74) *Attorney, Agent, or Firm*—Wenderoth, Lind & Ponack, L.L.P.

(57) ABSTRACT

In an information recording/reproduction apparatus (Arp), a preprogrammed recording specifying unit (1, As) specifies a date of distribution, a time of distribution, and a distribution source of information as well as an information recording unit (BD). Further, a preprogrammed recording setting displaying unit (8) displays a preprogrammed recording setting (As) on a two dimensional matrix (7), and a preprogrammed recording setting specifying unit (20) specifies each (8) preprogrammed recording setting (As) displayed on the two dimensional matrix. In addition, a preprogrammed recording setting displaying unit (30) displays the specified preprogrammed recording setting (As), and the preprogrammed recording setting editing unit (30) edits the preprogrammed recording setting (As).

18 Claims, 19 Drawing Sheets

U.S. PATENT DOCUMENTS

| | | | |
|---|---|---|---|
| 2001/0033736 A1* | 10/2001 | Yap et al. | 386/46 |
| 2002/0049620 A1* | 4/2002 | Uchida et al. | 705/5 |
| 2002/0124256 A1 | 9/2002 | Suzuka | |
| 2004/0013409 A1* | 1/2004 | Beach et al. | 386/83 |

FOREIGN PATENT DOCUMENTS

| | | |
|---|---|---|
| JP | 6-118185 | 4/1994 |
| JP | 11-98431 | 4/1999 |
| JP | 2000-278639 | 10/2000 |
| WO | 96/31980 | 10/1996 |
| WO | 01/47249 | 6/2001 |
| WO | 02/082808 | 10/2002 |

* cited by examiner

F I G. 7
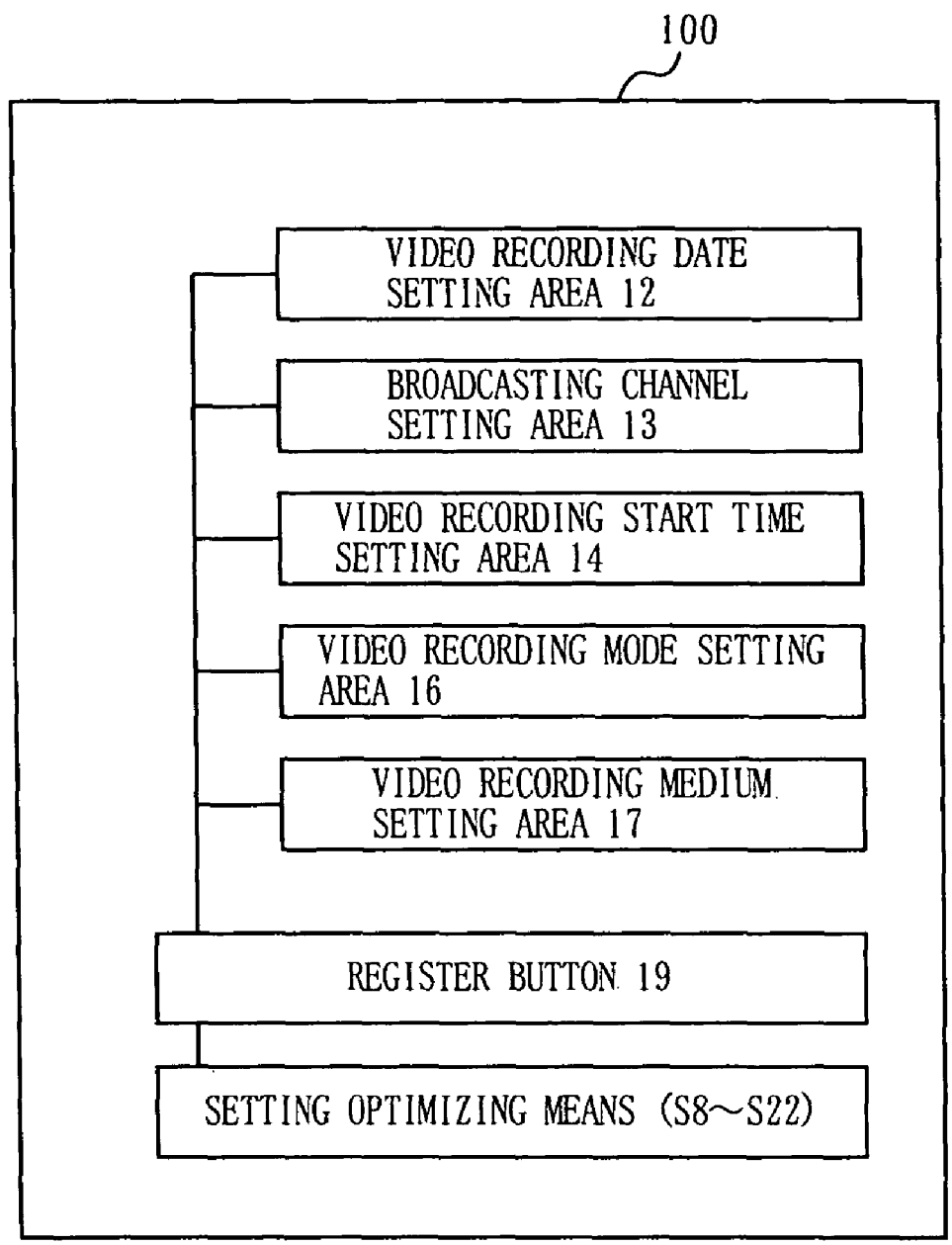

F I G. 1 9

| DEVICE | BD1 | | DVD1 | | EXT | |
|---|---|---|---|---|---|---|
| DRIVE | BD | HDD | DVD | HDD | S1 | S2 |
| ORDER OF PRIORITY | 4 | 1 | 6 | 2 | 3 | 5 |

INFORMATION RECORDING/REPRODUCTION APPARATUS AND RECORDING SYSTEM THEREOF

TECHNICAL FIELD

The present invention relates to an information recording/reproduction apparatus and a recording system thereof. More specifically, the present invention relates to a setting method for a preprogrammed recording of information.

BACKGROUND ART

Operations for performing a preprogrammed recording of information with a conventional information recording/reproduction apparatus and a recording system thereof will be briefly described, taking preprogrammed video recording of a program by a video recording/reproduction apparatus such as a television set as an example. At the time of preprogrammed video recording, a user operates the video recording/reproduction apparatus and evokes a new program video recording preprogramming inputting screen. Then, the user inputs necessary conditions for preprogrammed video recording, as prompted on the evoked new program video recording preprogramming inputting screen. Thereafter, the user further operates the video recording/reproduction apparatus to evoke a program video recording preprogramming confirmation screen to check whether the content of video recording preprogramming which has been performed at the new program video recording preprogramming inputting screen is correct or not.

Usually, programs which are preprogrammed for video recording are sorted according to the video recording preprogramming starting time of the program and displayed in a list table format written in text. Other than the list table format, a preprogramming table format in text is also proposed in Japanese Laid-Open Patent Publication No. 06-118185. Further, in addition to a preprogramming table format, a technique of displaying an operational displaying area as an overlapping text in conjunction with redundant preprogrammings or in short time slots is proposed in Japanese Laid-Open Patent Publication No. 2000-278639.

The video recording preprogramming operation using a new program video recording preprogramming screen and a program video recording preprogramming listing screen can also be realized by inputting necessary items to a remote control with LCD or the like and transferring the inputted items to the video recording/reproduction apparatus without manipulating the video recording/reproduction apparatus itself.

DISCLOSURE OF THE INVENTION

However, following problems exist with the program video recording preprogramming confirmation screen used in an information recording/reproduction apparatus such as the above-described video recording/reproduction apparatus.

In the case of displaying programs which have been preprogrammed for video recording in a list table format, it is difficult to find identical programs which are redundantly preprogrammed for video recording, so-called redundant program video recording preprogrammings, at a glance. Furthermore, since the user confirms the preprogramming state by following the displayed text, it is easy to overlook the preprogrammings. For this reason, there is a high possibility of failing in important program video recording preprogramming, due to redundant settings, erroneous settings, and forgetting to perform settings.

Further, the preprogramming table format disclosed in Japanese Laid-Open Patent Publication No. 06-118185 amounts to a mere preprogramming table version of a list table. Therefore, it is not possible to cope with program video recording preprogrammings on a video recording/reproduction apparatus comprising a plurality of independent video recording devices which are interconnected directly or via a network.

Moreover, in the case of a preprogramming table format proposed in the aforementioned Japanese Laid-Open Patent Publication No. 2000-278639, it is also not possible to cope with a program video recording preprogramming on a video recording/reproduction apparatus comprising a plurality of independent video recording devices. Specifically, even though operational displaying areas may be displayed in an overlapping manner in conjunction with redundant preprogrammings or in short time slots, such that they may be sequentially selected and displayed at the forefront for manipulation, all of them may not be displayable on the display screen if a large number of redundant preprogrammings and the like coincide. Therefore, in order to utilize the preprogramming table for confirming video recording preprogramming, displayed items and information, or displaying methods must be limited somehow. Although the existence of the plurality of independent video recording devices or video recording devices connected via a network is shown on the display screen, no consideration is given to any method for performing video recordings across such devices.

The above example illustrates preprogrammed video recording of a program by a video recording/reproduction apparatus such as a television set. However, the aforementioned issues are common problems to any information recording/reproduction apparatus on which one can basically set a preprogramming before the time of distribution to record information which is distributed at a predetermined time. It is needless to say that the same is also true of an information recording apparatus which does not have a reproduction function.

Thus, in view of the aforementioned problems regarding conventional video recording/reproduction apparatuses, an object of the present invention is to provide an information recording/reproduction apparatus and a recording method that facilitate grasping program video recording preprogrammings at a glance, prevent failure in performing important program video recording preprogrammings due to redundant settings, erroneous settings, and forgetting to perform settings, and, if redundant preprogrammings take place, draw the user's attention through providing an easily recognizable display mode. Another object of the present invention is to provide an information recording/reproduction apparatus and information recording system which reduces complication and errors in settings of program video recording preprogramming performed on a video recording device comprising a plurality of independent recording devices, an independent recording device having a plurality of recording media, or a recording device connected to a network, and realize optimum program video recording preprogramming settings as automatically as possible.

An information recording/reproduction apparatus for performing a preprogrammed recording of information distributed at a predetermined time from a predetermined distribution source to predetermined information recording means, based on preprogrammed recording settings determined before the time of distribution, the information recording/reproduction apparatus comprises:

recording/reproduction means for recording and reproducing the information;

preprogrammed recording specifying means for specifying, as the preprogrammed recording settings, a date of distribution, the time of distribution, the distribution source of the information, and information recording means;

preprogrammed recording setting displaying means for displaying the preprogrammed recording setting on a two dimensional matrix defined by the date of distribution, the information recording means, and the time of distribution;

preprogrammed recording setting specifying means for specifying each preprogrammed recording setting displayed on the two dimensional matrix;

preprogrammed recording setting displaying means for displaying the specified preprogrammed recording setting; and preprogrammed recording setting editing means for editing the displayed preprogrammed recording setting.

As described above, according to the present invention, when redundant preprogrammings take place, it is easily recognizable since preprogrammed recording settings are displayed so as to be spread out on a two dimensional matrix.

BRIEF DESCRIPTION OF THE DRAWINGS

FIG. 7 is a diagram illustrating exemplary elements included in a new recording setting information inputting unit shown in FIG. 1.

FIG. 19 is a diagram illustrating an example of order of priority in selecting recording devices in the information recording/reproduction apparatus shown in FIG. 10.

DETAILED DESCRIPTION OF THE INVENTION

First Embodiment

Hereinafter, with reference to FIGS. 1 to 9, an information recording/reproduction apparatus according to a first embodiment will be described below. The information recording/reproduction apparatus according to the present embodiment comprises one recording device and is used independently, i.e., without being connected to any other information recording/reproduction apparatus or the like. An example of such an apparatus may be a television set with a recording function which is not connected to other video recording apparatuses via a network or via wiring. For the present embodiment, a television set which only one DVD recorder that employs, as means for information recording/reproduction, a DVD-RAM as a recording medium is connected to or incorporated in will be described in detail as a specific example.

Figure 1:
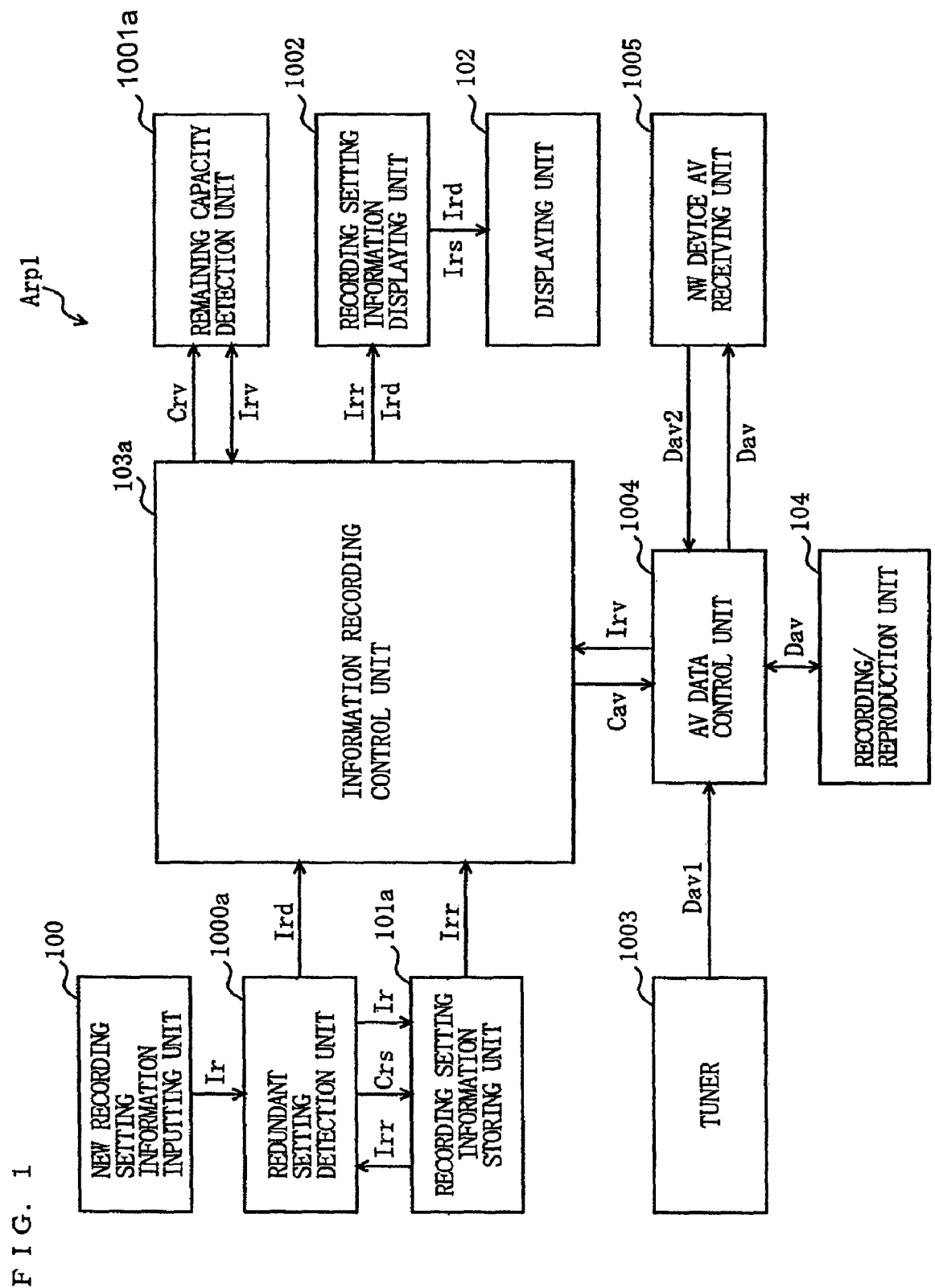
FIG. 1 is a block diagram illustrating the constitution of an information recording/reproduction apparatus according to a first embodiment of the present invention.

In FIG. 1, the constitution of the information recording/reproduction apparatus according to an embodiment of the present invention is illustrated. An information recording/reproduction apparatus Arp1 comprises a new recording setting information inputting unit 100, a recording setting information storing unit 101a, a displaying unit 102, an information recording control unit 103a, a recording/reproduction unit 104, a redundant setting detection unit 1000a, a remaining capacity detection unit 1001a, a recording setting information displaying unit 1002, a tuner 1003, an AV data control unit 1004, and a NW device AV receiving unit 1005.

The new recording setting information inputting unit 100 comprises a remote control or an inputting device such as a keyboard, and it receives a video recording preprogramming instruction made to the information recording/reproduction apparatus Arp1, based on a user's manipulation. The new recording setting information inputting unit 100 generates preprogramming data Ir in response to the received video recording preprogramming instruction.

The redundant setting detection unit 1000a has a function of detecting an occurrence of redundant preprogramming in the information recording/reproduction apparatus Arp1. Specifically, in response to the preprogramming data Ir outputted from the new recording setting information inputting unit 100, the redundant setting detection unit 1000a outputs a preprogramming state data requesting command Crs which requests the record setting information storing unit 101a for preprogramming state data Irr.

The recording setting information storing unit 101a is a database recording video recording preprogramming information which is registered in the information recording/reproduction apparatus Arp1. The recording setting information storing unit 101*a* outputs registered video recording preprogramming information Irr for a corresponding time slot to the redundant setting detection unit 1000*a*, in response to the preprogramming state data requesting command Crs outputted from the redundant setting detection unit 1000*a*.

The redundant setting detection unit 1000*a* determines the presence or absence of a redundant preprogramming occurrence, by comparing the preprogramming data Ir against the registered video recording preprogramming information Irr. If it is determined that no redundant preprogramming occurs, the redundant setting detection unit 1000*a* outputs the preprogramming data Ir to the recording setting information storing unit 101*a*. On the other hand, if it is determined that a redundant preprogramming occurs, the redundant setting detection unit 1000*a* generates redundant preprogramming detection information Ird and outputs it to the information recording control unit 103*a*.

The recording setting information storing unit 101*a* updates its video recording preprogramming information database, based on the preprogramming data Ir outputted from the redundant setting detection unit 1000*a*. The recording setting information storing unit 101*a* sequentially outputs video recording preprogramming information, which is registered in the video recording preprogramming information database, to the information recording control unit 103*a*.

The tuner 1003 receives information (e.g., a broadcasting program) supplied from an external information source such as a broadcasting station, and generates AV data Dav1. The AV data Dav1 is outputted to the AV data control unit 1004.

The NW device AV receiving unit 1005 is connected to an information source such as an external AV device or a recording apparatus via a network and the like. The NW device AV receiving unit 1005 outputs AV data Dav2, which is supplied from an external information source, to the AV data control unit 1004.

AV data control unit 1004 obtains an AV data attribute (e.g., a bit rate) of AV data Dav1 and AV data Dav2 which are inputted from the tuner 1003 and the NW device AV receiving unit 1005, and generates AV data attribute information. The AV data control unit 1004 causes the recording/reproduction unit 104 to record the AV data Dav1 and AV data Dav2 at appropriate times, based on an AV control signal Cav outputted from the information recording control unit 103*a*. Hereinafter, the AV data Dav1 and AV data Dav2 will be collectively referred to as AV data Dav, unless otherwise specified.

Further, the AV data control unit 1004 reads out the AV data Dav recorded in the recording/reproduction unit 104, based on AV control signal Cav. The AV data Dav having been read is supplied to an external AV device, a recording apparatus, or the like, via the NW device AV receiving unit 1005.

The remaining capacity detection unit 1001*a* detects an unrecorded portion of the recording capacity, i.e., an amount of data which is still recordable, of an information recording medium (a DVD-RAM, in the present embodiment) comprised in the recording/reproduction unit 104, and generates and stores remaining capacity information Irv. The generation of the remaining capacity information Irv is performed as follows. First, the remaining capacity detection unit 1001 outputs the remaining capacity command CRv to the information recording control unit 103*a*, and the information recording control unit 103*a* queries the AV data control unit 1004 about the recordable capacity of the recording/reproduction unit 104. Then, as remaining capacity information Irv, the AV data control unit 1004 notifies the information recording control unit 103*a* of the recordable capacity of the recording/reproduction unit 104 which is managed in the course of recording and reading out of the AV data Dav being made to the recording/reproduction unit 104.

Then, in response to the remaining capacity command CRv from the information recording control unit 103*a*, the remaining capacity detection unit 1001*a* outputs the remaining capacity information Irv, which has been notified by the AV data control unit 1004, to the information recording control unit 103*a*.

The recording setting information displaying unit 1002 generates preprogramming information image data Irs indicating video recording preprogramming information of the present time, based on the registered video recording preprogramming information Irr which is inputted from the recording setting information storing unit 101*a* via the information recording control unit 103*a*. The displaying unit 102 displays a video recording preprogramming setting screen 1*a* exemplified in FIG. 2 to the user, based on the preprogramming information image data Irs. Further, when the redundant preprogramming occurrence is detected by the above-described redundant setting detection unit 1000*a*, the recording setting information displaying unit 1002 indicates to the user the occurrence of a redundant preprogramming on the displaying unit 102, based on the redundant preprogramming detection information Ird inputted via the recording control unit 103*a*.

As the information recording/reproduction apparatus Arp1 and a video recording device, devices capable of video recording such as a DVD recorder, a Blu-ray disk recorder, a hard disk recorder, a videotape recorder, and a personal computer may be used. For a video recording medium, any recording medium may be used, e.g., optical disks such as a DVD-RAM, a DVD-R, a DVD-RW, a DVD+R, a DVD+RW, a Blu-ray Disc, a Video-CD; a hard disk; any type of memory card such as a SD card; and videotapes such as D-VHS, S-VHS and DV may be used.

Figure 2:
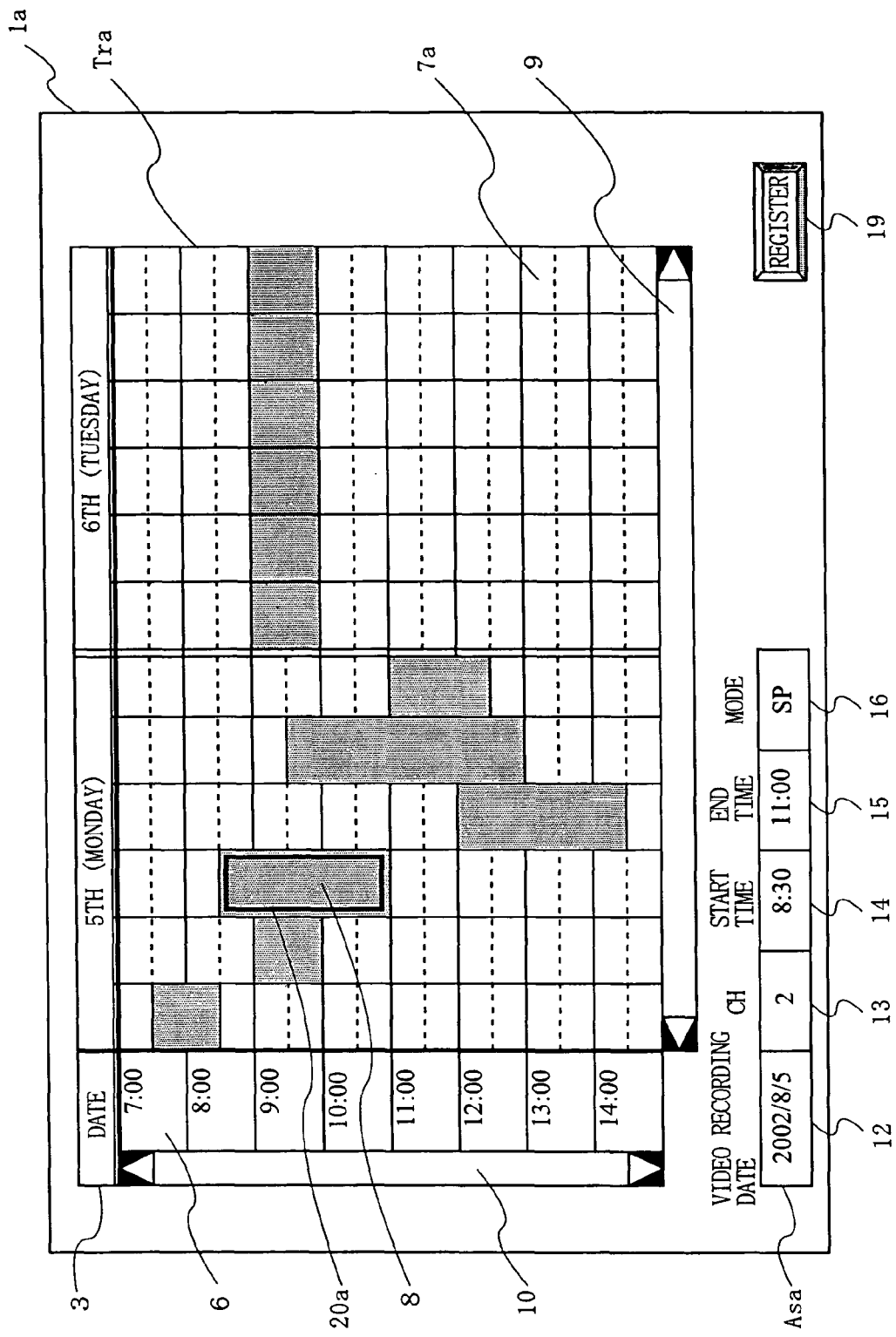
FIG. 2 is a diagram illustrating an example of a video recording preprogramming setting screen on the information recording/reproduction apparatus shown in FIG. 1.

In FIG. 2, a video recording preprogramming setting screen 1*a* to be displayed on the display screen of the displaying unit 102 such as a television set is schematically shown. The video recording preprogramming setting screen 1*a* is generally divided into: a video recording preprogramming state table Tra displaying an image representing a video recording preprogramming state (registered video recording preprogramming information Irr) based on the preprogramming data Ir, which is video recording preprogramming information inputted by the user; a video recording preprogramming setting section Asa for the user to use for a video recording preprogramming setting by inputting preprogramming information thereto; and a register button 19.

The video recording preprogramming state table Tra comprises a date displaying section 3 (denoted as "date" in the figure), a time displaying section 6, a video recording preprogramming operating area 7*a*, a video recording preprogramming setting indication 8, a horizontal scroll bar 9, and a vertical scroll bar 10. In the date displaying section 3, a target date for which a video recording preprogramming is set is displayed. In the present example, both dates of the 5th (Monday) and the 6th (Tuesday) are displayed as video recording preprogramming targets.

In the time displaying section 6, video recording preprogramming targeted time is displayed. In the present example, the time from 7:00 to 15:00 (explicitly, until 14:00) is the target for preprogramming.

In the video recording preprogramming operating area 7*a*, various video recording pattern as defined by the aforementioned date and recording time are graphically displayed. In the example herein, the video recording preprogramming operating area 7*a* is further divided into six areas (vertical rows) by five vertical lines. This indicates that although the information recording/reproduction apparatus Arp1 physically comprises only one recording apparatus which is the recording/reproduction unit 104, the recording/reproduction unit 104 is to be virtually treated as a plurality of storing apparatuses.

In one method, the above can be realized by dividing the recording area of the physical recording medium in the recording/reproduction unit 104 into a plurality of partitions and performing recording to each partition by a multi-task process. Each vertical row corresponds to a virtual storing device. Specifically, the present example illustrates a case where a maximum of six simultaneous video recordings can be performed in the single recording/reproduction unit 104.

However, the actual number of video recordings which can be simultaneously performed depends on the relationship between the processing ability of the information recording/reproduction apparatus Arp1 and the processing load required for the video recording. Therefore, in the information recording/reproduction apparatus video recording preprogramming setting screen 1a, the number of video recording preprogrammings which can be accepted and the actual number of video recording preprogrammings which can be performed are different. This will be described later in detail with reference to the flowchart of FIG. 5.

In FIG. 2, an actually video recording-preprogrammed portion (shown hatched) may be displayed in a different color from the color of any other portion of the video recording preprogramming operating area 7a, for example, for the purpose of differentiation. This video recording-preprogrammed portion is called the video recording preprogramming setting indication 8. The user can intuitively grasp the content of video recording preprogrammings, according to the pattern of the video recording preprogramming setting indication 8 which is graphically displayed on the video recording preprogramming operating area 7a.

A video recording preprogramming setting indication designating pointer 20a is used for designating a specific portion on the video recording preprogramming operating area 7a, as a result of which the setting contents corresponding to the designated portion is displayed in the video recording preprogramming setting section Asa. In the present example, a video recording preprogramming is set for 8:30 to 11:00 of the 5th (Monday) on a recording medium DVD-RAM of a video recording device DVD recorder. In the video recording preprogramming setting section Asa, not only such setting information but also further detailed information is shown, which will be described later in detail with reference to FIG. 3 and FIG. 4.

The user can display a date portion which cannot be displayed within the limited displaying area of the video recording preprogramming state table Tra by operating the horizontal scroll bar 9. Likewise, the user can display a time portion which cannot be displayed in the video recording preprogramming state table Tra by operating the vertical scroll bar 10. Specifically, the video recording preprogramming state of days before or after the 5th (Monday) and the 6th (Tuesday) or at a time before or after 7:00 to 15:00 can be displayed.

The video recording preprogramming setting section Asa, in which a user inputs various information for the purpose of setting a video recording preprogramming and which presents the setting information to the user, comprises a video recording date setting area 12, a broadcasting channel setting area 13, a video recording start time setting area 14, a video recording end time setting area 15, and a video recording mode setting area 16. In the present example, as mentioned above, the inputted information in the video recording preprogramming setting indication 8 which has been designated by the video recording preprogramming setting indication designating pointer 20a is being presented.

To the video recording date setting area 12, a date at which to perform the video recording that is video recording-preprogrammed is inputted. In the present example, it is illustrated that a video recording is set to be started on August 5th of the year 2002.

To the broadcasting channel setting area 13, a channel on which a video recording-preprogrammed program is to be broadcasted is inputted. In the present example, it is illustrated that channel 2 is set.

To the video recording start time setting area 14, a start time of video recording for a video recording-preprogrammed program is inputted. In the present example, it is illustrated that 8:30 is set.

To the video recording end time setting area 15, a time at which to end the video recording of a video recording-preprogrammed program is inputted. In the present example, 11:00 is set.

To the video recording mode setting area 16, a type of video recording mode, i.e., long play or standard play, is inputted. In the present example, standard play is shortened and displayed as SP in the display.

The user performs a video recording preprogramming by correctly setting each area of the video recording preprogramming setting section Asa, and after the user confirms the setting state, the video recording preprogramming is completed by pressing the register button 19 so as to finalize registration of the setting contents. As a result, the finally-registered video recording preprogramming is reflected to the video recording preprogramming operating area 7a of the video recording preprogramming state table Tra and displayed as the video recording preprogramming setting indication 8. The user can again change the setting information, by designating one of the video recording preprogramming setting indications 8 to which the video recording preprogramming has been reflected with the video recording preprogramming setting indication designating pointer 20a so as to allow detailed video recording preprogramming setting information to be displayed in the video recording preprogramming setting section Asa.

The aforementioned video recording preprogramming setting screen 1a may be arranged so that a calendar is displayed at an appropriate position therein. In this case, by selecting a displayed date on the calendar, a desired date can be selectively inputted, in order to input or change the distribution date of a preprogrammed recording setting (video recording date setting area 12), using the video recording preprogramming state table Tra or the video recording preprogramming setting section Asa.

Figure 3:
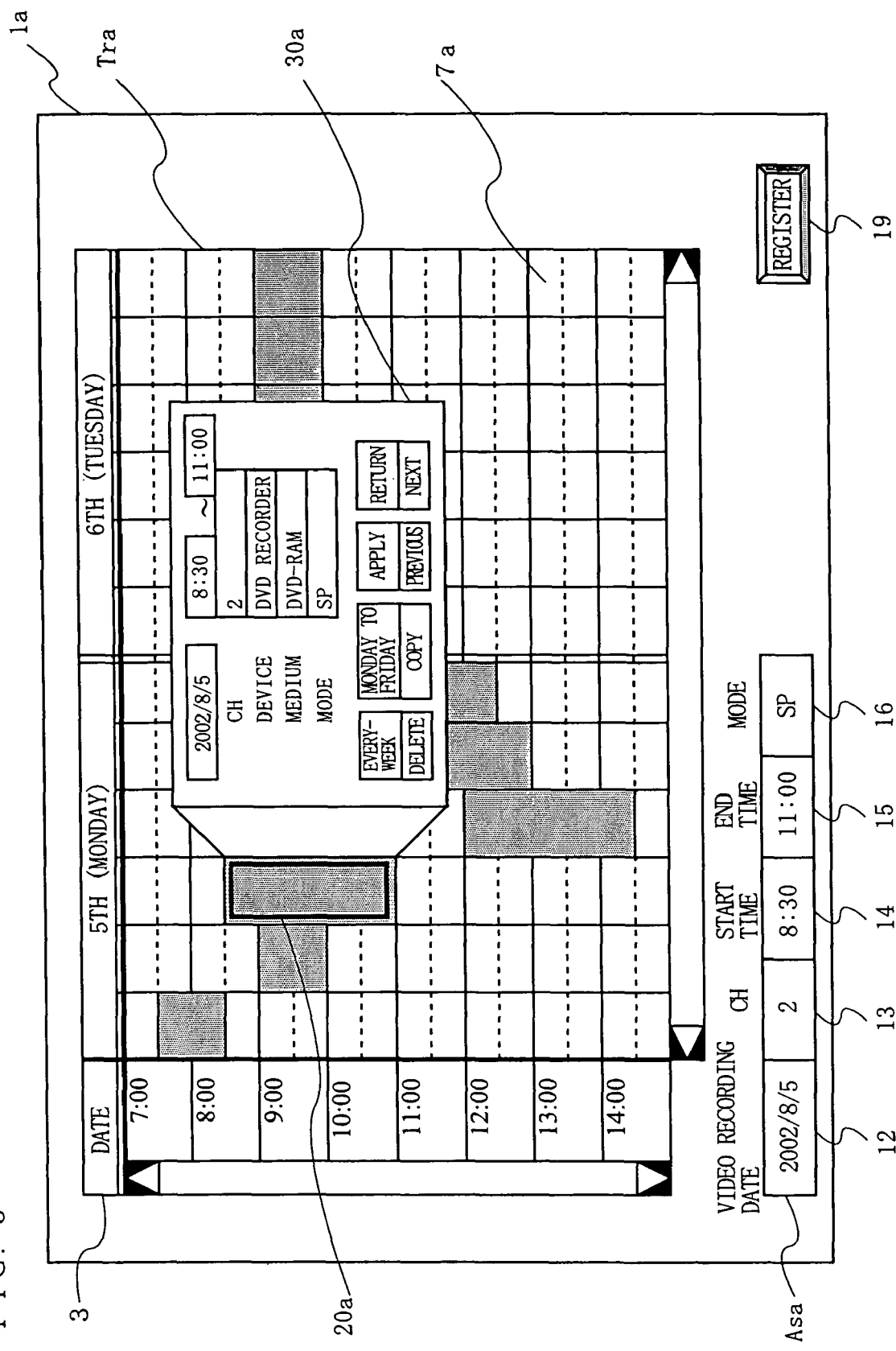
FIG. 3 is a diagram illustrating a pop-up menu being displayed when a preprogrammed portion on the video recording preprogramming setting screen shown in FIG. 2 is designated.

With reference to FIG. 3, video recording preprogramming setting on the information recording/reproduction apparatus Arp1 will be described specifically. As described with reference to FIG. 2, a video recording preprogramming setting is performed by designating a desired video recording preprogramming portion of the video recording preprogramming state table Tra in the video recording preprogramming setting screen 1a with the video recording preprogramming setting indication designating pointer 20a, and inputting setting information to the video recording preprogramming setting section Asa. Specifically, the user operates a remote control or a direction button among the buttons on the apparatus in such a manner that a selection cursor is moved to the portion at which a video recording preprogramming is desired, thus enabling setting input to be made in the video recording preprogramming setting section Asa. Then, the user operates on a number button or the direction button or the like to appropriately make an input into each area of the video recording preprogramming setting section Asa.

The user inputs a year, month, and date of video recording in the video recording date setting area 12, selectively inputs a channel for broadcasts such as terrestrial wave analog, BS, BS digital, CS digital, and terrestrial digital to the broadcasting channel setting area 13, inputs a start time for video recording to the video recording start time setting area 14, and inputs an end time for video recording to the video recording end time setting area 15. In the present example, August 5th of the year 2002 is inputted as the date for video recording, channel 2 is inputted as the broadcasting channel, 8:30 is inputted as the program start time, and 11:00 is inputted as the video recording end time. After all inputs are correctly inputted, registration is executed by moving the selection cursor onto the register button 19 and pressing an enter button or an execution button of the remote control or among the buttons on the apparatus.

Once registered, the setting information which has been inputted to the video recording preprogramming setting section Asa is reflected to the video recording preprogramming operating area 7a. After the video recording preprogramming setting is reflected to the video recording preprogramming operating area 7a, the user can perform various operations by moving the video recording preprogramming setting indication designating pointer 20a. Specifically, as explicitly shown in FIG. 3, when the video recording preprogramming setting indication designating pointer 20a is moved to one of the video recording preprogramming setting sections in the video recording preprogramming operating area 7a, information set at that portion is presented in the form of a pop-up menu 30a.

Figure 4:
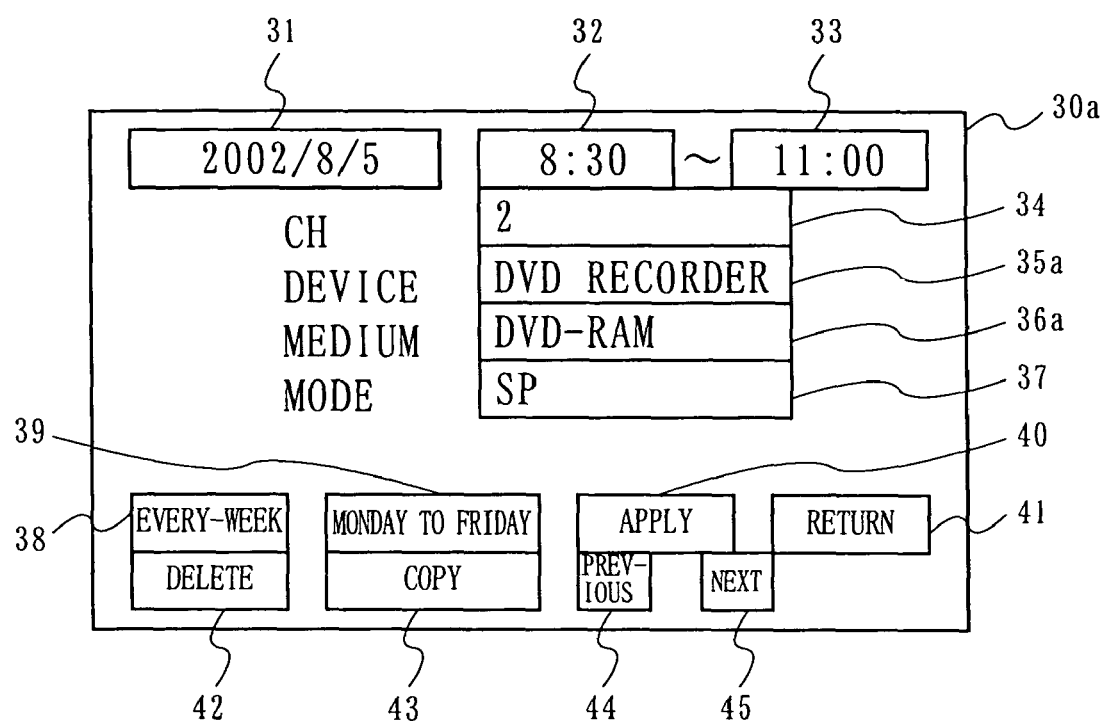
FIG. 4 is an enlarged view of the pop-up menu illustrated in FIG. 3.

With reference to FIG. 4, the pop-up menu 30a will be described. The pop-up menu 30a comprises a video recording date setting area 31, a video recording start time setting area 32, a video recording end time setting area 33, a broadcasting channel setting area 34, a video recording device area 35a, a video recording medium area 36a, a video recording mode setting area 37, an every-week setting button 38, a weekday setting button 39, an apply button 40, a return button 41, a delete button 42, a copy button 43, a display previous button 44, and a display next button 45.

The video recording date setting area 31, the video recording start time setting area 32, the video recording end time setting area 33, the broadcasting channel setting area 34, and the video recording mode setting area 37 have the same functions as those of the video recording date setting area 12, the video recording start time setting area 14, the video recording end time setting area 15, the broadcasting channel setting area 13, and the video recording mode setting area 16 of the video recording preprogramming setting section Asa, respectively. Further, by operating the apply button 40, various setting changes can be reflected to the video recording preprogramming operating area 7a. Thus, the apply button 40 has the same function as that of the aforementioned register button 19.

On the other hand, in the video recording device area 35a and the video recording medium area 36a, a video recording device and a video recording medium which are incorporated in the information recording/reproduction apparatus Arp1 and usable in a fixed manner are displayed. According to the present example, a DVD recorder and a DVD-RAM are displayed as described above, and the user cannot change these to anything else.

The user can set various settings for the same day of every week by manipulating the every-week setting button 38. Furthermore, the user can set various settings for each day of the week, i.e., Monday to Friday, to be similarly performed for every week by manipulating the weekday setting button 39. With the return button 41, various setting changes can be returned to the state prior to the changes. With the delete button 42, a video recording preprogramming setting can be deleted. With the copy button 43, various settings can be copied to the video recording date setting area 31, the video recording start time setting area 32, and the video recording end time setting area 33. With the display previous button 44, a video recording preprogramming setting which was set earlier in terms of setting order may be switched to be displayed, when it is not being displayed due to having an overlapping video recording date setting and video recording start time setting. With the display next button 45, a video recording preprogramming setting which was set later in terms of setting order can be switched to be displayed when it is not being displayed due to having an overlapping video recording date setting and video recording start time setting.

In short, the every-week setting button 38, the weekday setting button 39, the return button 41, the delete button 42, the copy button 43, the display previous button 44, and the display next button 45 have functions specific to the pop-up menu 30a.

Methods for changing a video recording preprogramming setting by utilizing various functions included in the pop-up menu 30a will be specifically described. For example, if the user moves the video recording preprogramming setting indication designating pointer 20a to the video recording preprogramming setting portion which shows 8:30 to 11:00 of August 5th on a DVD recorder, the pop-up menu 30a is displayed. By executing the apply button 40 after various settings are changed on the pop-up menu 30a, settings are reflected and the indication is shifted to the preprogramming setting area corresponding to the date and time, and the broadcasting channel which are in accordance with the setting contents.

In the case of changing any setting back before it is applied, the user can execute the return button 41 and the displayed contents within the pop-up menu 30a will return to its prior state. If the every-week setting button 38 is executed, a program from 8:30 to 11:00 on channel 2 is preprogrammed to a DVD recorder for every Monday in the SP mode. If the weekday setting button 39 is executed, a program from 8:30 to 11:00 on channel 2 is preprogrammed to a DVD recorder for Monday through Friday at every week in the SP mode. In the every-week setting and weekday setting, the number of weeks to be automatically preprogrammed may be fixed by the system or allowed to be set.

Further, in conjunction with an electronic program table, a search may be performed for a program title, genre, a performer, a keyword, or the like, and the result of the search may be automatically used for a program video recording preprogramming setting. When the delete button 42 is executed, a video recording preprogramming is deleted and the indication disappears, so that the video recording preprogramming setting indication designating pointer 20a moves to a next video recording preprogramming setting portion or to a previous video recording preprogramming setting portion (video recording preprogramming setting indication 8). Then, the pop-up menu 30a in accordance with the content of that portion is displayed. If no more video recording preprogramming setting exists, it moves to the video recording preprogramming state table Tra.

In the case of copying a video recording preprogramming setting, setting the date in the video recording date setting area 31 to the 6th day and executing the copy button 42, for example, will allow the same preprogramming setting contents to be copied to the 6th day. Similar operations will occur with respect to other setting items as well. Conventional methods for a copying operation only allow an item by item copying just like when performing a new input. However, according to the present invention, the entire settings can be copied. Therefore, if a setting content of interest is the same as or similar to the original to be copied, the setting input is easy to perform.

In the case of changing video recording preprogramming settings, when the video recording preprogramming setting indication designating pointer 20a is focused on, i.e., positioned at a specific video recording preprogramming setting portion (the video recording preprogramming setting indication 8) of the video recording preprogramming operating area 7a, changes may be made directly with a remote control and the like, or setting data candidates shown in a list box format and made to be selectable may be displayed for a selective setting with an execution button or the like.

In the case where redundant preprogramming settings exist, the video recording preprogramming setting indication designating pointer 20a may have its displayed color changed from the usual preprogramming settings, flicker, or have its displayed form changed, in order to call the user's attention. Additionally, the contents of redundant setting may be confirmed using the display previous button 44 and the display next button 45. The video recording preprogramming setting indication designating pointer 20a may be displayed in an overlapping manner with slight displacements, although this will make it very difficult to view, if a large number of redundant preprogrammings coincide.

The reason for causing the user to pay special attention to redundant preprogramming like this is because, as mentioned earlier, the number of preprogrammed video recordings, which are actually executable differs from the number of video recording preprogrammings that are acceptable and also fluctuates depending on the state of load. In other words, the user is informed of the possibility that those redundantly preprogrammed may not actually be successfully videorecorded. In addition, the system can generate an even more specific alarm to the user based on the load associated with redundant preprogrammings. This also will be described later with reference to the flowcharts shown in FIG. 5 and FIG. 6.

In the case where no redundant preprogramming exists, the display previous button 44 and the display next button 45 do not need to be displayed. Other than redundant preprogramming, if, for example, preprogrammings coincide within a short time slot, a specially-changed display form may be indicated to permit confirmation of each setting content. In the case where indications of redundant preprogramming and the like are coinciding, the number thereof may be displayed to further facilitate the user's recognition.

As for the operation of the video recording preprogramming setting indication designating pointer 20a at the time of focusing, other than displaying the pop-up menu 30a, a portion in the video recording preprogramming operating area 7a on which the video recording preprogramming setting indication designating pointer 20a is focused may have its displayed color changed from the usual displayed color, flicker, or have its displayed form changed. These operations during focusing can be made available for the user to freely set.

By providing the horizontal scroll bar 9, a video recording preprogramming state in the date direction can be displayed in more detail, and by providing the vertical bar 10, a video recording preprogramming state in the time direction can be displayed in more detail. On the other hand, if it is desirable to roughly view an outline of video recording preprogramming settings, e.g., on a weekly or a monthly basis, a menu for altering the displaying range may be provided so as to realize a function which enables grasping the desired state at a glance.

Conventionally, it has been possible to perform program-by-program preprogrammings based on an electronic program table. However, time settings cannot be freely performed and preprogramming on a plurality of devices has not been supported. In the present invention, a button may be provided in the pop-up menu 30a for shifting to an electronic program table, such that execution of a preprogramming selection on the electronic program table is reflected in the setting contents in the pop-up menu 30a, and that information data such as a program title, stereo, etc. in various electronic program tables can also be set and recorded. An operational state of the video recording device can be grasped faster with schedule-like date-and-time basis preprogramming settings rather than with a listing of programs provided by an electronic program table.

A video recording preprogramming execution state can be easily grasped by changing the displayed color of, by flickering, or by changing the display form of, the video recording preprogramming setting indication designating pointer 20a focused on a video recording preprogramming, depending on whether it has been videorecorded, under video recording, or not videorecorded yet. Once a video recording is completed, the corresponding video recording preprogramming setting in the video recording preprogramming operating area 7a may be deleted immediately or after a predetermined time, or may be left to remain until deleted by the user himself or herself. A video recording which is completed can be allowed to be reproduced as triggered by the video recording preprogramming setting indication designating pointer 20a, if the medium is reproducible.

Figure 5:
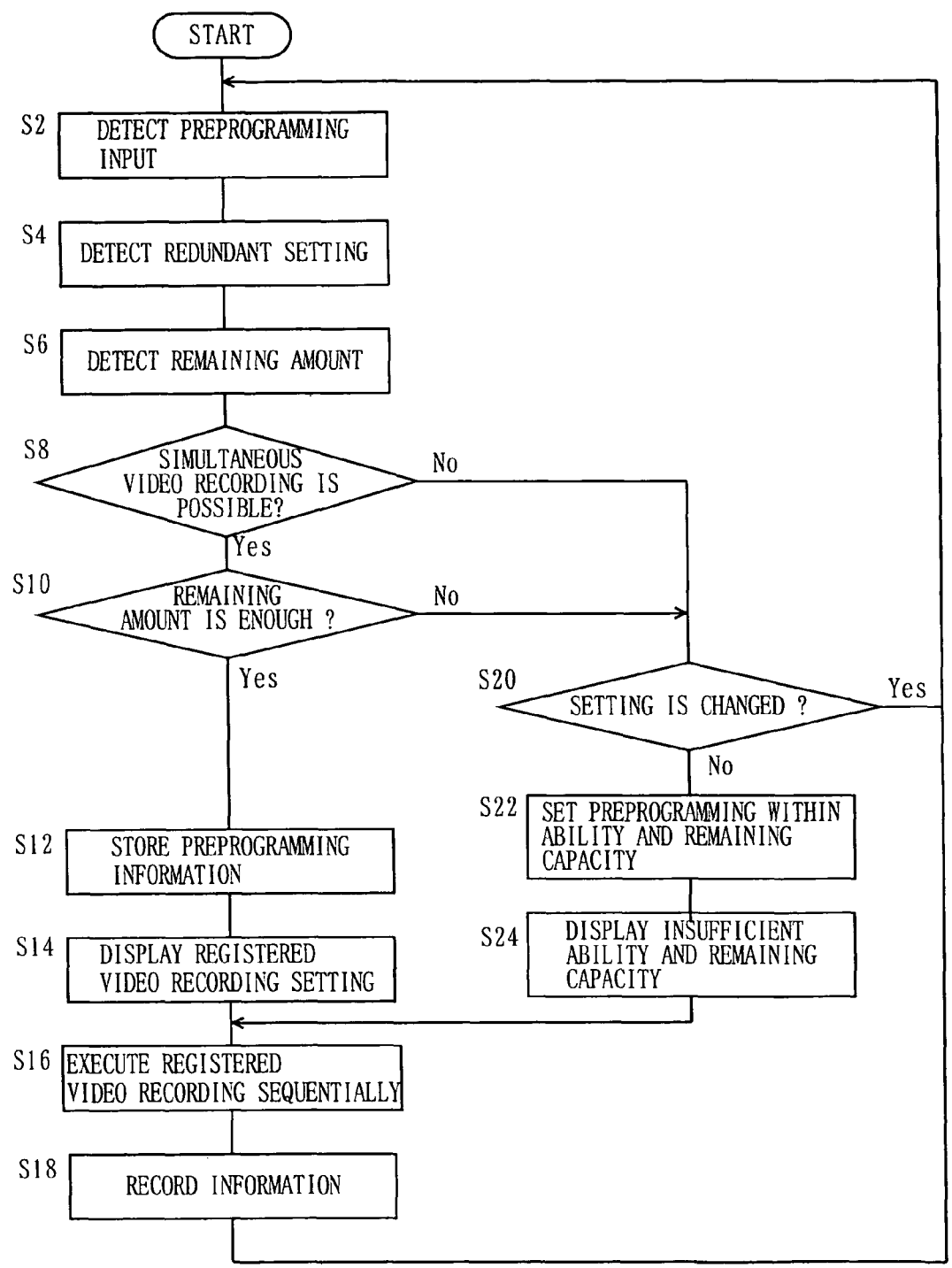
FIG. 5 is a flowchart illustrating a video recording preprogramming operation of the information recording/reproduction apparatus shown in FIG. 1.

Next, with reference to the flowchart in FIG. 5, the video recording preprogramming operation of the aforementioned information recording/reproduction apparatus Arp1 will be described.

First, at step S2, the presence or absence of a preprogrammed video recording instruction from the user is detected. Specifically, preprogramming data Ir outputted from the new recording setting information inputting unit 100 is obtained. Then, control proceeds to next step S4.

At step S4, the redundant setting detection unit 1000a outputs the preprogramming state data requesting command Crs to the recording setting information storing unit 101a in response to the preprogramming data Ir. Then, the presence or absence of redundant settings is determined based on the registered video recording preprogramming information Irr returned from the recording setting information storing unit 101a. If any redundant settings are found, the video recording preprogramming setting indication designating pointer 20a may have its displayed color changed from the usual preprogramming settings, flicker, or have its displayed form changed, as mentioned above. Then, control proceeds to next step S6.

At step S6, a remaining recording capacity of a recording medium (a DVD-RAM) in the recording/reproduction unit 104 (a DVD recorder) is detected by the remaining capacity detection unit 1001a. Then, control proceeds to next step S8.

At step S8, it is determined whether the preprogrammed video recording inputted at step S2 is executable or not, based on the result of redundant setting detection at the above-mentioned step S6. Specifically, whether the execution load of the preprogrammed video recording redundantly received at present is tolerable or not is determined. If it is determined as "Yes", control proceeds to next step S10.

At step S10, it is determined whether the remaining capacity of the recording medium in the recording/reproduction unit 104 is sufficient or not for the preprogrammed video recording inputted at step S2, based on the result of the remaining amount detection obtained at the above-mentioned step S8. If it is determined as "Yes", control proceeds to next step S12.

At step S12, the recording setting information storing unit 101a records the preprogramming data Ir inputted via the redundant setting detection unit 1000a into the video recording preprogramming information database storing it. Consequently, the video recording preprogramming designated by the preprogramming data Ir is registered to the information recording/reproduction apparatus video recording preprogramming setting screen 1a, and the registered video recording preprogramming information Irr is updated. Then, control proceeds to next step S14.

At step S14, the recording setting information displaying unit 1002 displays a state of the registered preprogrammed video recording as the registered video recording setting on the displaying unit 102, based on registered video recording preprogramming information Irr updated at step S12. Then, control proceeds to next step S16.

At step S16, the information recording control unit 103a notifies the registered preprogrammed video recording to the AV data control unit 1004 based on the registered video recording preprogramming information Irr. Then, control proceeds to next step S18.

At step S18, the AV data control unit 1004 causes the recording/reproduction unit 104 to record AV data Dav1 or AV data Dav2, when a designated time comes. Then, control returns to step S2.

If it is determined as "No" at the above-mentioned step S8, in other words, if it is determined that simultaneous video recording of all of the video recording redundantly preprogrammed is impossible to perform, control proceeds to step S20.

If it is determined as "No", in other words, if the remaining amount determined as insufficient at the aforementioned step S10, control proceeds to step S20.

At step S20, the user is asked as to whether settings of preprogrammed video recording should be changed or not. Specifically, if it is determined as "No" at step S8, the user is asked as to whether to reduce the number of redundant preprogramming or not due to there being a heavy load. On the other hand, if it is determined as "No" at step S10, it is asked as to whether to reduce the total time of preprogrammed video recording received or not due to insufficient total recordable time. If the user changes the settings, in other words, if the user corrects the inputted content using the new recording setting information inputting unit 100 in response to these inquiries, it is determined as "Yes" and control returns to the aforementioned step S2. On the other hand, if the user does not change the settings, control proceeds to next step S22.

At step S22, video recording preprogrammings are set as much as the remaining amount allows, to the limit of simultaneous video recording ability for redundancies. Then, control proceeds to next step S24.

At step S24, the displaying unit 102 indicates to the user the setting of preprogrammed video recording being impossible. Specifically, if "No" is determined at step S8, a message that simultaneous video recording is impossible is displayed, and if "No" is determined at step S10, an alarming message that the remaining amount is insufficient is displayed. Then, control proceeds to the above-described step S16.

In accordance with the above description, it is intended to account for the user's intention as much as possible even in a state where preprogrammed video recording is set to the information recording/reproduction apparatus Arp1 and an alarm of invalid setting is being displayed due to the number of redundancies limitation for video recording preprogramming and the remaining capacity limitation of a recording medium. The reason is that the user has newly set a video recording preprogramming, a state may exist where the preprogramming is impossible to perform. However, there is a possibility that such a state may be improved as time passes. Specifically, the number of redundancies may be reduced due to completion in the execution of another video recording which is already under execution or for which preprogramming has already been registered, or cancellation of settings. Moreover, the remaining capacity may increase by a deletion of already-videorecorded data. At step S8 and S10, these improvements in video recording conditions are detected and optimization of video recording preprogramming settings is conducted.

Figure 6:
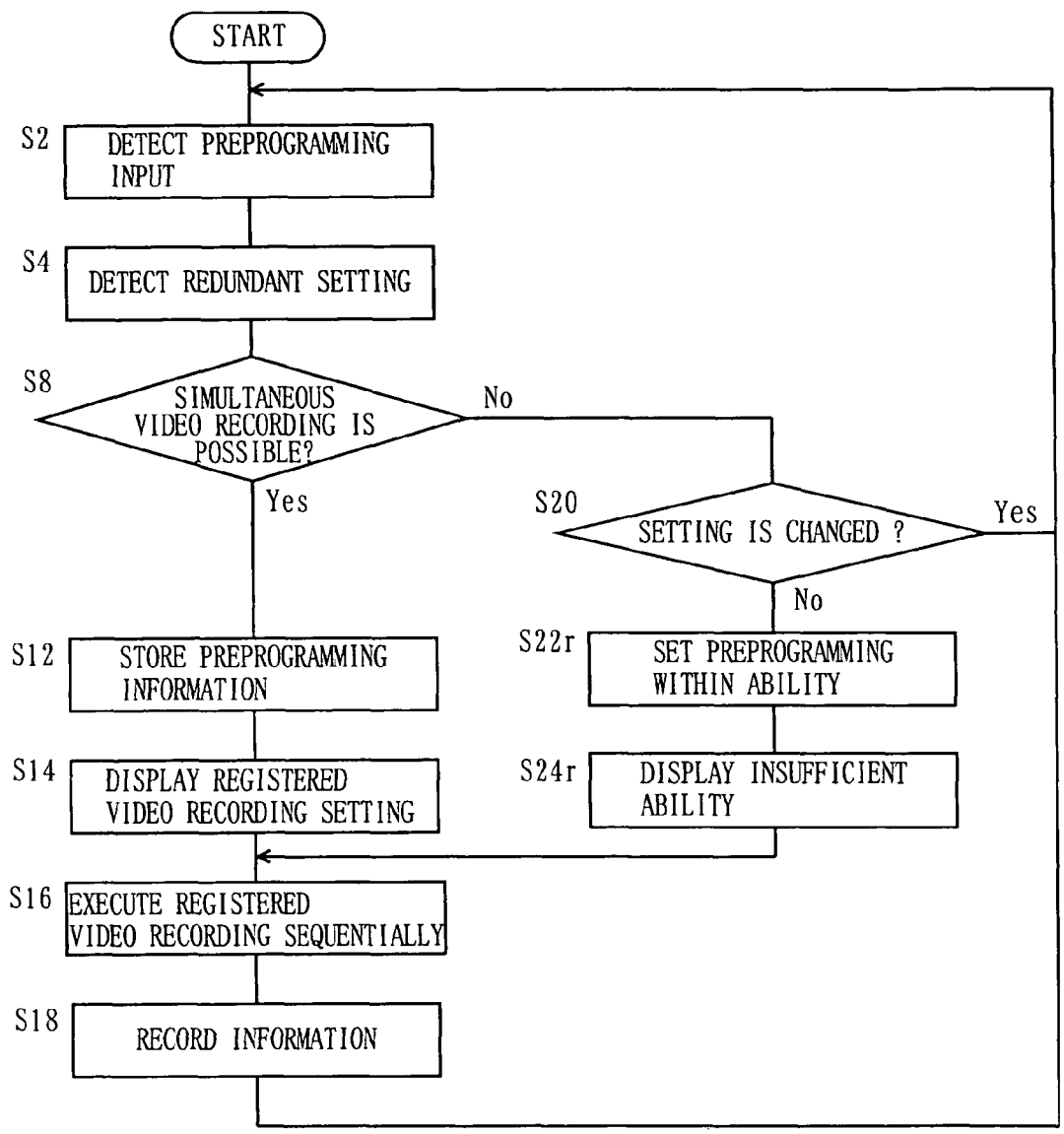
FIG. 6 is a flowchart illustrating a video recording preprogramming operation on the information recording/reproduction apparatus shown in FIG. 1, in the case of not detecting a remaining capacity of a storage medium.

With reference to the flowchart in FIG. 6, a video recording preprogramming operation of the case in which the remaining capacity detection unit 1001a is omitted from the information recording/reproduction apparatus Arp1 will be described. The construction of the information recording/reproduction apparatus Arp1 in this case is in the state where the remaining capacity detection unit 1001a and the registered video recording preprogramming information Irr are removed from the block diagram shown in FIG. 1. As for the video recording preprogramming operation in this case, step S6 and step S10 are removed from the flowchart shown in FIG. 5, and step S22 and step S24 are replaced by S22r and S24r respectively.

As a result, at step S22r, video recording preprogramming is set to the full extent of the simultaneous video recording ability for redundancies. At step S24r, a message that simultaneous video recording is impossible is displayed on the displaying unit 102.

In FIG. 7, items which can be inputted through the new recording setting information inputting unit 100 and its inputting means are schematically shown. The new recording setting information inputting unit 100 comprises the video recording date setting area 12, the broadcasting channel setting area 13, the video recording start time setting area 14, the video recording end time setting area 15, the video recording mode setting area 16, all of which are shown in the video recording preprogramming setting section Asa, and setting optimization means constituted by step S8 to S24. The video recording medium setting area 17 is utilized in a second embodiment described later.

Figure 8:
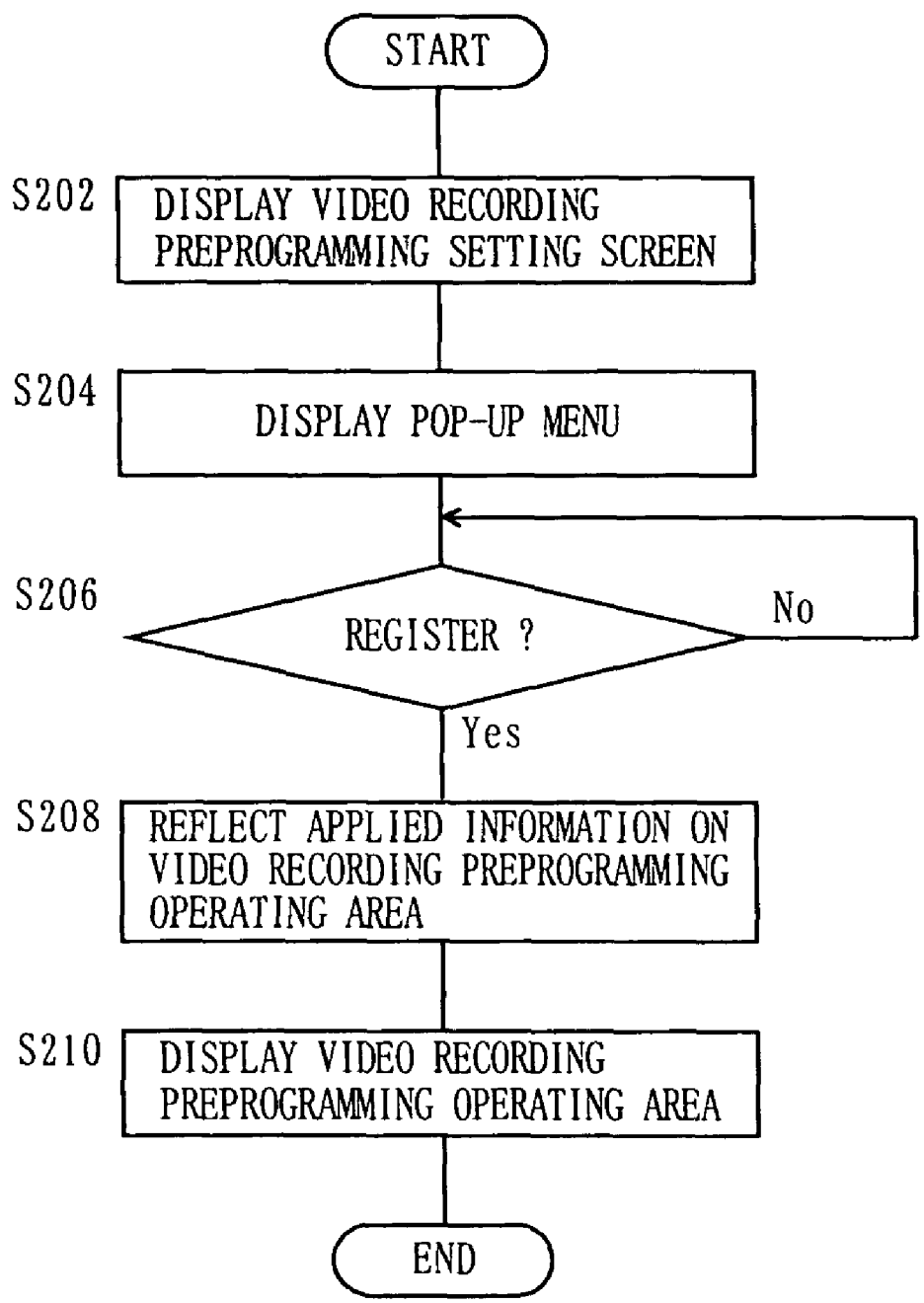
FIG. 8 is a flowchart illustrating a video recording preprogramming changing process operation on the information recording/reproduction apparatus shown in FIG. 1.

Next, with reference to the flowchart shown in FIG. 8, the video recording preprogramming changing process operation will be described. First, at step S202, the video recording preprogramming setting screen 1a is displayed. Then, the user is prompted to make an input for a video recording preprogramming setting.

At step S204, the pop-up menu 30a is displayed when the user causes the video recording preprogramming setting indication designating pointer 20a to be focused on a portion of the video recording preprogramming operating area 7a which has already been preprogrammed for video recording. The user manipulates the horizontal scroll bar 9 and the vertical scroll bar 10 as necessary, to focus on the desired video recording-preprogrammed portion with the video recording preprogramming setting indication designating pointer 20a. Then, an input to each area of the pop-up menu 30a is prompted to the user.

At step S206, the presence or absence of the apply button 40 manipulation detection after the input to each area of the pop-up menu 30a is determined. At the time when the manipulation of the apply button 40 is detected, control proceeds to next step S208.

At step S208, the video recording preprogramming setting information which has been set and inputted to the pop-up menu 30a is reflected on the video recording preprogramming operating area 7a.

At step S210, the video recording preprogramming setting indication 8 is displayed on the video recording preprogramming operating area 7a based on the video recording preprogramming setting information which has been reflected at step S208. If it is redundantly preprogrammed, the form of the video recording preprogramming operating area 7a is respectively changed and displayed. Then, this subroutine is completed.

Figure 9:
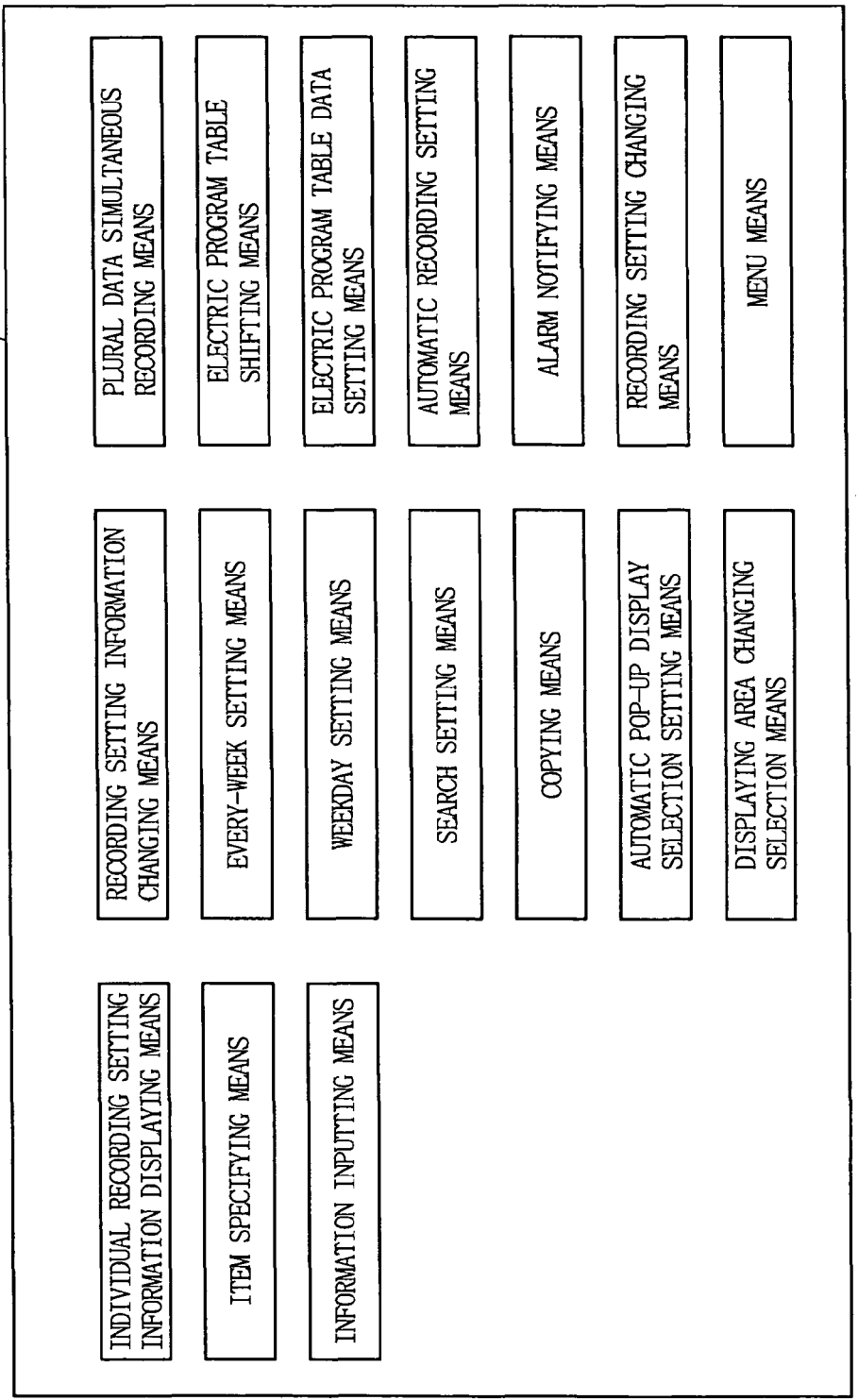
FIG. 9 is a diagram illustrating exemplary elements included in a recording setting information recording unit of the information recording/reproduction apparatus shown in FIG. 1.

In FIG. 9, features for realizing the recording setting information displaying unit 1002 schematically shown. The recording setting information displaying unit 1002 can be constituted from the various means shown in this figure.

As mentioned above, the information recording/reproduction apparatus according to the first embodiment has features described hereafter.

By providing a new video recording preprogramming setting area, there is provided a desirable effect in that a new video recording preprogramming is registered more clearly and accurately than a new video recording preprogramming area designation using a remote control and a mouse on coordinates at a preprogramming table.

By enabling every-week setting and a weekday setting, a program video recording preprogramming operation which has regularity is made easy.

By a search setting which can be conducted in conjunction with an electronic program table, there is provided a desirable effect in that the video recording of a desired program can be easily set and a program desired for video recording preprogramming can be set without being overlooked.

In conventional methods, copying operation can only be performed exactly like performing a new input. With a copy button, there is provided a desirable effect in that the cumbersome program video recording preprogramming setting which are the same or similar in setting contents can be easily and comfortably set.

In the event redundant preprogramming settings, the video recording preprogramming setting indication may have its displayed color changed from the usual preprogramming settings, flicker, or have its displayed form changed to call attention. Further, through confirming the contents of redundant setting by a display previous button and a display next button, there is provided a desirable effect in that a difficulty in viewing which may occur if a large number of redundant preprogrammings coincide when using a conceivable method of displaying video recording preprogramming setting indications in an overlapping manner with slight displacements, can be prevented.

There is provided a desirable effect in that when indications of redundant preprogrammings and the like are overlapping, the number of them may be displayed to facilitate recognition.

As for the operation of a cursor at the time of focusing, focusing may be indicated simply by changing the displayed color from the usual one, flickering, or changing the displayed form, and a pop-up display may be presented with a menu button or the like, or a pop-up display may be presented automatically at the time of focusing. By allowing these operations to be modified in accordance with the user's settings, there is provided a desirable effect in that an automatic pop-up display may be selected according to the user's preference, thus enabling a comfortable manipulation which suits to individual preferences such as how busy or kind the automatic display should be.

There is provided a desirable effect in that, by providing a horizontal bar, a more detailed display in the date direction can be presented, and by providing a vertical bar, a more detailed display in the time direction can be presented. On the other hand, by providing a menu for altering the displaying range, if it is desirable to roughly view an outline of video recording preprogramming settings, e.g., on a weekly or a monthly basis, a function which enables grasping the desired state at a glance can be provided.

By providing a button in a pop-up display menu for shifting to an electronic program table such that execution of a preprogramming selection on the electronic program table is reflected in the setting contents in the pop-up display, and that information data such as a program title, stereo, etc., in various electronic program tables can also be set and recorded, there is provided a desirable effect in that inputs of various video recording data can be made easy.

By changing the displayed color of, flickering, or changing the displayed form of, a video recording preprogramming setting indication, depending on whether the program video recording preprogramming has been executed, under execution, or not executed yet, there is provided a desirable effect in that the video recording preprogramming execution state can be easily grasped.

There is provided a desirable effect in that, by deleting any video recording preprogramming setting indication immediately after the completion of execution in program video recording preprogramming, a programming table can be made easy to view, and by deleting preprogramming setting data as well, memory in the device can be saved.

By deleting after a predetermined time those program video recording preprogrammings whose execution have been completed, there is provided a desirable effect in that the latest program video recording preprogramming information can be confirmed and memory in the device can also be saved thereby.

By deleting after user confirmation those program video recording preprogrammings whose execution have been completed, there is provided a desirable effect in that a memo function of details of instances of user execution can also be realized and memory in the device can be saved thereby, too.

Further, there is provided a desirable effect in that, by virtually being used as a plurality of recording devices through a multi-task process, the information recording/reproduction apparatus can have its resource put to the best possible use without waste, even though physically being a single recording device. In addition, in the case where preprogrammed video recordings are set up to resource limitations, preprogrammings can be accepted up to a maximum possible amount of redundancies and video recording time at that point of time, and when the resource condition is improved, preprogrammings can again be accepted up to a greater amount of redundancies and video recording time. In other words, there is provided a desirable effect in that a user's requests can be satisfied as much as possible by dynamically responding to changes in resource.

Second Embodiment

With reference to FIG. 10 to FIG. 19, an information recording/reproduction apparatus according to a second embodiment will be described. The information recording/reproduction apparatus according to the present embodiment comprises one or more recoding devices and is interconnected to other video recording apparatuses via a network or wiring. As an example of such, a television set connected to a plurality of recorders through a LAN may be given.

Figure 10:
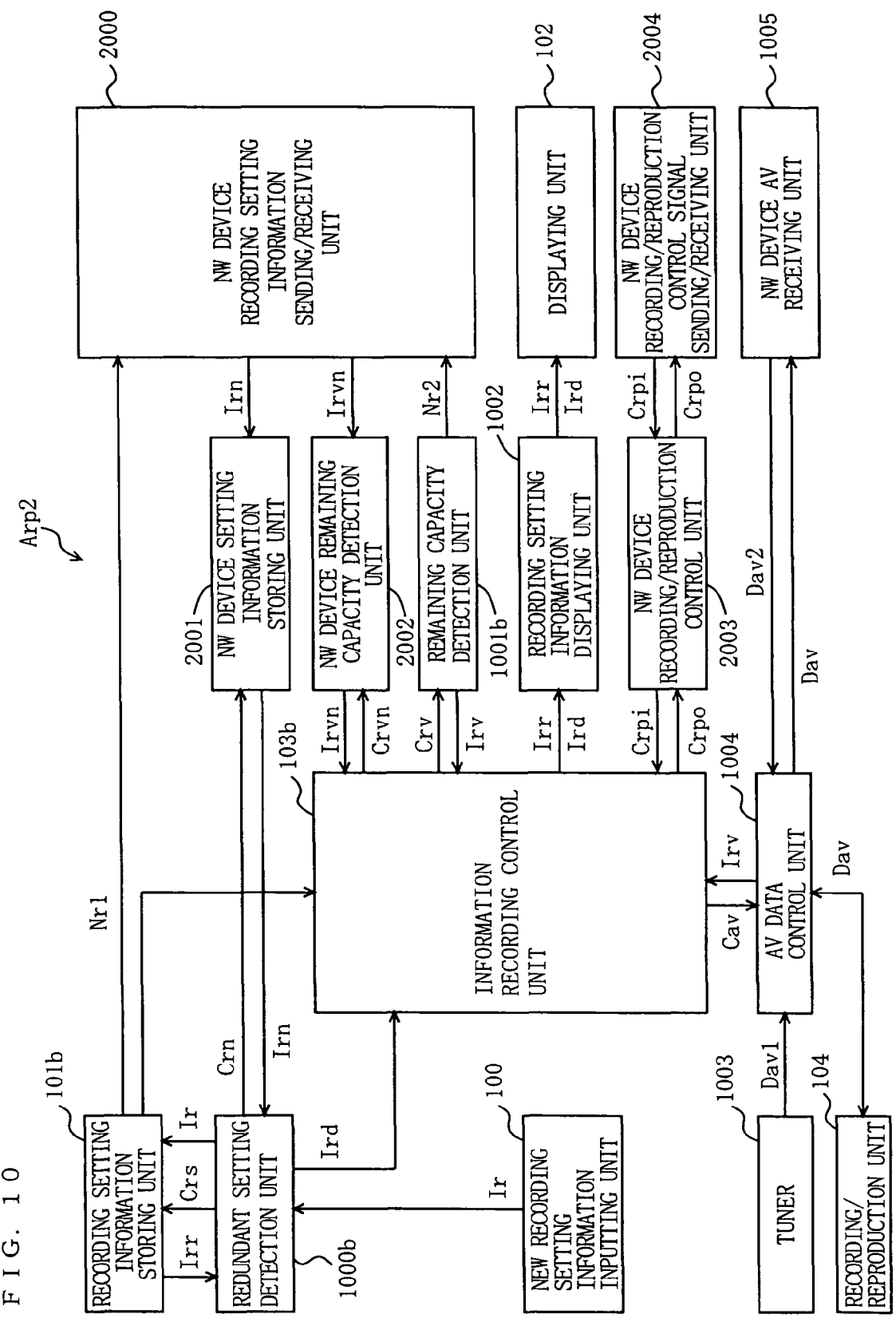
FIG. 10 is a block diagram illustrating the constitution of an information recording/reproduction apparatus according to a second embodiment of the present invention.

In FIG. 10, the information recording/reproduction apparatus according to an embodiment of the present invention is shown. In an information recording/reproduction apparatus Arp2, a recording setting information storing unit 101b, an information recording control unit 103b, a redundant setting detection unit 1000b, and a remaining capacity detection unit 1001b respectively replace the recording setting information storing unit 101a, information recording control unit 103a, redundant setting detection unit 1000a, and the remaining capacity detection unit 1001a in the information recording/reproduction apparatus Arp1 shown in FIG. 1. Furthermore, a NW device recording setting information sending/receiving unit 2000, a NW device setting information storing unit 2001, a NW device remaining capacity detection unit 2002, a NW device recording/reproduction control unit 2003, and a NW device recording/reproduction control signal sending/receiving unit 2004 are newly provided.

The NW device recording setting information sending/receiving unit 2000 exchanges preprogrammed video recording setting information Irn with an external recording device connected via a network and the like.

The NW device setting information storing unit 2001 is a database which, via the NW device recording setting information sending/receiving unit 2000, receives external video recording preprogramming information Irn set to the external recording device and records it. In response to the external preprogramming state data requesting command Crn outputted by the redundant setting detection unit 1000b, the NW device setting information storing unit 2001 outputs the external video recording preprogramming information Irn to the redundant setting detection unit 1000b.

The NW device remaining capacity detection unit 2002 receives external remaining capacity information Irvn indicative of an available storing capacity of the recording medium in the external recording device via the NW device recording setting information sending/receiving unit 2000, and stores the external remaining capacity information Irvn.

The NW device recording/reproduction control unit 2003 generates a recording/reproduction instruction output Crpo instructing the external recording device to record and reproduce. Then, the recording/reproduction instruction output Crpo is outputted to the external recording device via the NW device recording/reproduction control signal sending/receiving unit 2004. The NW device recording/reproduction control unit 2003 further receives a recording/reproduction instructing input Crpi which is an instruction from the external recording device directed to the information recording/reproduction apparatus Arp2.

In addition to the functions of the recording setting information storing unit 101a, the recording setting information storing unit 101b has a function of outputting an update notification Nr1, which, when the video recording preprogramming information database is updated, notifies the details thereof to the NW device recording setting information sending/receiving unit 2000.

In addition to the functions of the redundant setting detection unit 1000a, the redundant setting detection unit 1000b has a function of outputting the external preprogramming state data requesting command Crn, which requests the NW device setting information storing unit 2001 for video recording preprogramming information directed to the recording device connected via a network. Further, the redundant setting detection unit 1000b determines the presence or absence of redundant settings, based on the preprogramming data Ir and the external video recording preprogramming information Irn.

In addition to the functions of the remaining capacity detection unit 1001a, the remaining capacity detection unit 1001b has a function of outputting to the NW device recording setting information sending/receiving unit 2000, a capacity changing notification Nr2, which, when the remaining capacity of the recording/reproduction unit 104 changes, notifies the details thereof.

When receiving the update notification Nr1 from the remaining capacity detection unit 1001b, the NW device recording setting information sending/receiving unit 2000 updates the database of the NW device remaining capacity detection unit 2002. Further, when receiving the capacity changing notification Nr2 from the new recording setting information inputting unit 100b, the NW device recording setting information sending/receiving unit 2000 updates the database of the NW device remaining capacity detection unit 2002.

The information recording/reproduction apparatus Arp2 is preferably constituted by a plurality of video recording/reproduction devices interconnected via a network. A network adaptor for connecting to the external Internet is also connected to the information recording/reproduction apparatus Arp2. The communication network may utilize connection via Ethernet, optical fibers, a wireless or coaxial cable LAN or the like, an IEEE1394 interface device, or a modem.

As means for connecting to an external via a network adaptor, telephone lines, ADSL, other DSLs, FTTH (optical fibers), CATV, wireless telephones such as mobile telephones or PHS, or power lines may be used.

Figure 11:
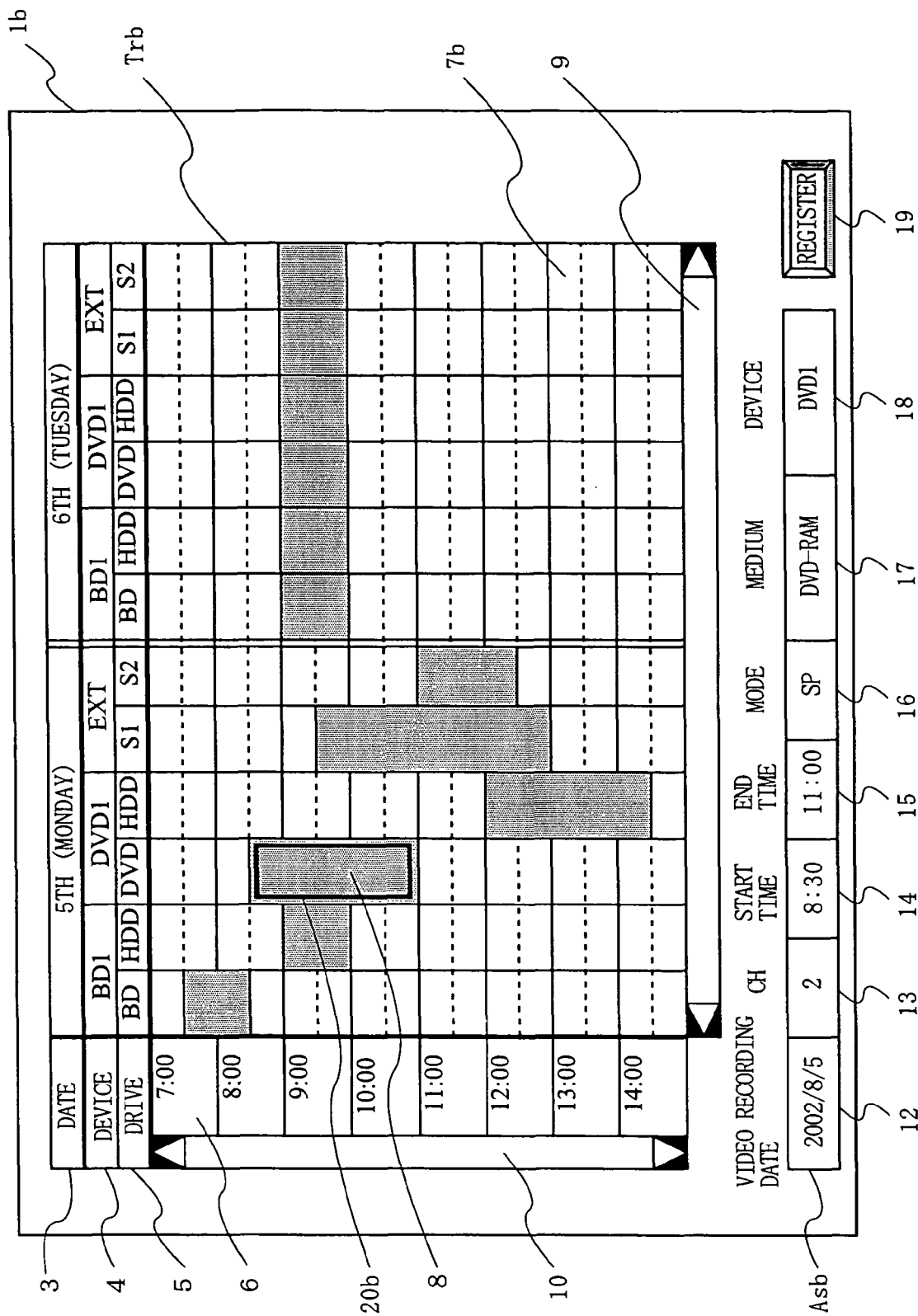
FIG. 11 is a diagram illustrating an exemplary video recording preprogramming setting screen of the information recording/reproduction apparatus shown in FIG. 10.
Figure 12:
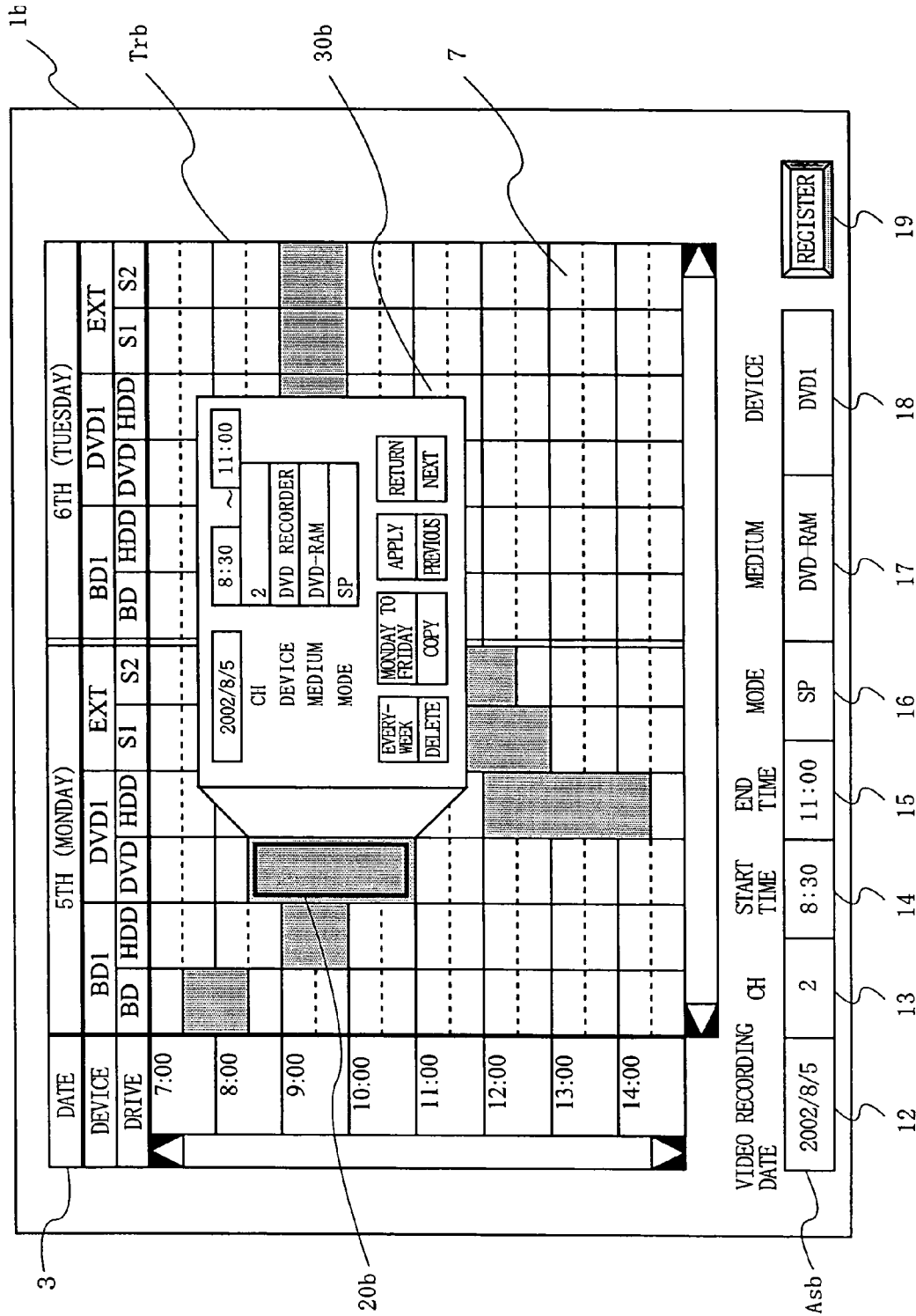
FIG. 12 is a diagram illustrating a pop-up menu being displayed when a preprogrammed portion on the video recording preprogramming setting screen shown in FIG. 10 is designated.

With reference to FIG. 11 and FIG. 12, a video recording preprogramming setting in the information recording/reproduction apparatus Arp2 will be described. In FIG. 11, a video recording preprogramming setting screen 1b to be displayed on the displaying unit 102 is schematically shown. In the video recording preprogramming setting screen 1b, a video recording preprogramming state table Trb, a video recording preprogramming operating area 7b, and a video recording preprogramming setting section Asb replace the video recording preprogramming state table Tra, video recording preprogramming operating area 7a, and the video recording preprogramming setting section Asa in the video recording preprogramming setting screen 1a shown in FIG. 2, respectively. Further, a video recording device displaying section 4 (denoted as "device" in the figure) and a medium displaying section 5 (denoted as "drive" in the figure) are added.

In the video recording device displaying section 4, an external video recording device which is connected to the information recording/reproduction apparatus Arp2 directly or via a network and which may be used for video recording preprogramming is displayed. In the present example, it is shown that a video recording preprogramming can be made on three video recording devices, i.e., BD1, DVD1, and EXT.

In the medium displaying section 5, a medium of each video recording device which is shown in the video recording device displaying section 4 and to which information will actually be recorded is displayed. In the present example, a video recording device BD1 includes a BD (Blue Ray Disc) and a HDD (Hard Disc Drive); DVD1 includes a DVD and a HDD; and EXT includes recording devices S1 and S2 which are to be connected via the Internet.

The video recording preprogramming operating area 7b is basically the same as the aforementioned video recording preprogramming operating area 7a. However, one recording device incorporated in the information recording/reproduction apparatus Arp1 is the target in the video recording preprogramming operating area 7a, whereas in the video recording preprogramming operating area 7b, not only a recording device incorporated in the information recording/reproduction apparatus Arp2 but also a plurality of recording devices interconnected via a network or wiring are the targets.

By designating a specific portion on the video recording preprogramming operating area 7b, the video recording preprogramming setting indication designating pointer 20b causes setting contents corresponding to that portion to be displayed on the video recording preprogramming setting section Asb. In the present example, a video recording preprogramming is set to 8:30 to 11:00 on the 5th (Monday) on a recording medium DVD of the video recording device DVD recorder (DVD1) and the portion is designated. In addition to the aforementioned setting information, more detailed information is displayed in the video recording preprogramming setting section Asb. Such detailed information will be described later with reference to FIG. 12.

A video recording medium setting area 17 and a video recording device setting area 18 are newly provided in the video recording preprogramming setting section Asb, as compared to the video recording preprogramming setting section Asa. In the video recording medium setting area 17 is used for selecting a desired drive specifically shown in the medium displaying section 5. The video recording device setting area 18 is used for selecting a desired device shown in the video recording device displaying section 4. According to the present example, DVD1 is selected as a device and DVD is also selected as a recording medium at the medium displaying section 5.

In FIG. 12, with the information recording/reproduction apparatus Arp2, a pop-up menu 30b which is displayed when a video recording preprogramming portion desired in the video recording preprogramming state table Trb is designated with the video recording preprogramming setting indication designating pointer 20b, is presented.

To the video recording device setting area 18 of the video recording preprogramming setting section Asb, a device on which to videorecord a program is set and inputted. In the present example, a DVD recorder (DVD1), which is a DVD recording unit, is selected. In the video recording medium setting area 17, a video recording medium which can be used by a video recording device integrated into the device set at the video recording device setting area 18 is selected. In the present example, a DVD-RAM is selected.

Figure 13:
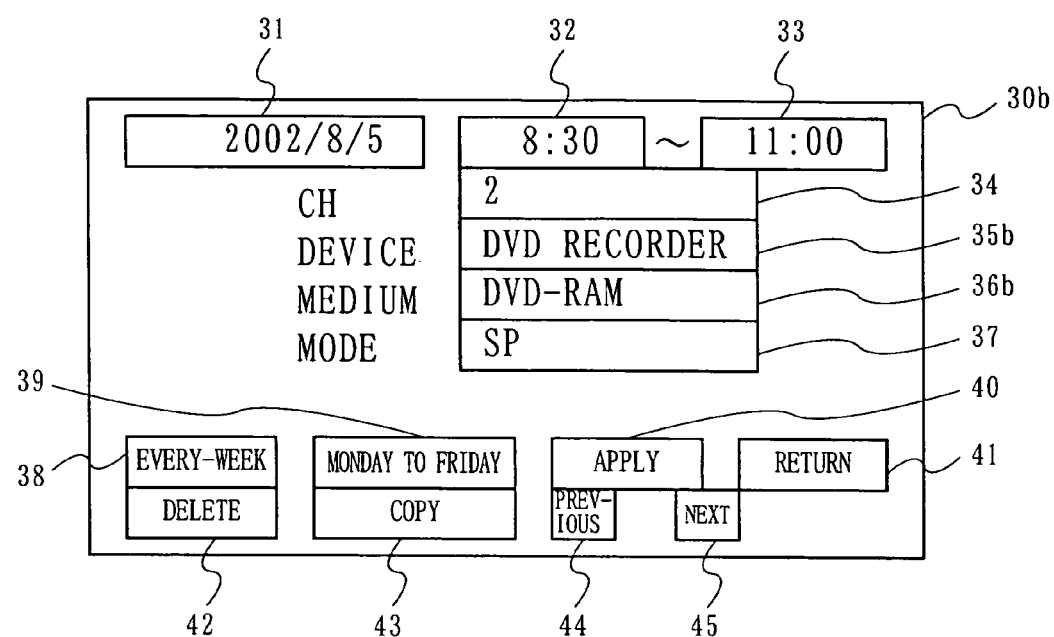
FIG. 13 is an enlarged view of the pop-up menu shown in FIG. 12.

With reference to FIG. 13, the pop-up menu 30b will be described. In the pop-up menu 30b, as compared to the pop-up menu 30a shown in FIG. 4, the video recording device area 35a and the video recording medium setting area 36a are replaced with a video recording device setting area 35b and a video recording medium setting area 36b, respectively. This corresponds to the fact that a video recording device and a video recording medium, which are not capable of being selected in the information recording/reproduction apparatus video recording preprogramming setting screen 1a, are capable of being selected in the present embodiment.

Methods for changing a video recording preprogramming setting by utilizing various functions included in the pop-up menu 30b will be specifically described. For example, when a user moves the video recording preprogramming setting indication designating pointer 20b to the video recording preprogramming setting portion from 8:30 to 11:00 of August 5th on the DVD recorder of DVD1, the pop-up menu 30b is displayed. After various settings are changed on the pop-up menu 30b, by executing the apply button 40, the settings are reflected and the indication is shifted to the preprogramming setting area corresponding to the date and time, the device, and the preprogramming setting area of the medium which are in accordance with the setting contents.

In the case of changing any setting back before it is applied, the user can execute the return button 41 and the displayed contents within the pop-up menu 30b will return to its prior state. If the every-week setting button 38 is executed, a program from 8:30 to 11:00 on channel 2 is preprogrammed on the DVD recorder of DVD1 for every Monday in the SP mode. If the weekday setting button 39 is executed, a program from 8:30 to 11:00 on channel 2 is preprogrammed to the DVD recorder of DVD1 for Monday through Friday at every week in the SP mode. In the every-week setting and weekday setting, the number of weeks to be automatically preprogrammed may be fixed by the system or allowed to be set.

The operation of aforementioned changes in video recording preprogramming will be described in detail below. When an extension in the broadcasting of a preprogrammed program occurs, for example, in FIG. 11, when the preprogramming for 12:00 to 14:30 on the 5th on the HDD of DVD1 is extended to 15:00, the previously preprogrammed preprogramming for 14:00 to 14:30 may be changed to the unpreprogrammed BD or HDD of BD1 or S1 of EXT in the video recording preprogramming setting. If there are a plurality of setting-changeable candidates of video recording devices as in the case above, their order of priority may be determined by the system of the information recording device as a standard rule or allowed to be set by the user. For example, if the devices to be changed are a plurality of video recording devices, their order of priority is set as follows in a descending order: a different video recording device within the same device; the same kind of video recording device in a device connected to a network; and a smallest network address.

In FIG. 19, an exemplary order of priority in selecting recording devices in the information recording/reproduction apparatus shown in FIG. 10 is presented. In the present example, on the condition that each recording device is not in use or being selected, they are selected as in the following order: first, the HDD of BD1; then, the HDD of DVD1; then, the S1 of EXT; the BD of BD1; the S2 of EXT; then, the DVD of DVD1.

As shown in FIG. 19, the user may directly set an order from a list of network-connected devices and video recording devices thereof. Even if the aforementioned changes or extensions are man-made, i.e., made by a user manipulation of executing the apply button 40 on the pop-up menu 30b, a similar operation is performed.

Similarly, if, at minimum, a video recording date, a start time, an end time, and a channel are inputted to the video recording preprogramming setting section Asb and the register button 19 is executed, a video recording preprogramming is set in accordance with the aforementioned order of priority. The order of priority may be the same as that described above or another rule may be used, depending on the case. In the case of a minimum information input, a device and a medium are automatically set according to the above-described rule. Further, a video recording device and a device, additionally designated, will be automatically set, as conditions are added to the rule.

A device and a video recording device are designated for the date and time inputted and registration is executed. Further, a case is considered where a setting which has been changed on the pop-up menu 30b coincides on a device or a video recording device that has already been set. For example, a case in FIG. 11 where a preprogramming for 9:00 to 10:00 on the 5th on the DVD of DVD1 in the video recording preprogramming setting section Asb is registered and executed is considered. In this case, the DVD of DVD1 is already preprogrammed for 8:30 to 11:00. If this preprogramming is not a preprogramming designating a video recording device, then this preprogramming is changed to the HDD of DVD1 and the above-described registered and executed preprogramming is set.

Therefore, it follows that the attribute of the item at the time of video recording preprogramming setting should carry information as to whether an explicit designation from the user has been made or not. Furthermore, if the preprogramming for 12:00 to 14:30 on the 5th on the HDD of DVD1 is changed to BD on the pop-up menu 30b, because the S1 and the S2 of EXT are preprogrammed, the setting is changed to the BD of BD1. As described above, because the device and the system automatically search for and set an empty slot, video recording preprogramming settings can be easily performed. In the case where there is a coincidence, too, because the device and the system automatically perform re-setting according to a predetermined order of priority, video recording preprogramming settings can be easily performed without requiring the user to check the video recording preprogramming state in every one of a plurality of devices to determine the optimum for re-setting.

In a hybrid device where a plurality of video recording devices such as a HDD and a DVD recorder are comprised in each device, by allowing a plurality of video recording devices to operate simultaneously, it becomes possible to make a plurality of redundant video recording preprogrammings. Even if a plurality of redundant video recording preprogrammings consequently occur, such a video recording preprogramming state is displayed in a manner very easy to understand, according to the present invention.

Further, those which are under execution can be simultaneously reproduced during video recording. In addition, a button may be provided in a pop-up display to indicate a content of video recording, a date and time of video recording, a video recording time, a data capacity, a video recording mode, video recording picture/sound information, and the like, as a detailed display.

As mentioned above, the information recording/reproduction apparatuses Arp2 according to the present embodiment may be connected together via a network and function to perform recording information in the place of each other. In such a case, a master device and slave device relationship emerges, where one manages preprogramming of the other. The information recording/reproduction apparatus Arp2 shown in FIG. 10 is illustrated as having a structure for functioning as a master device. To function as a slave device, there are functions unnecessary for functioning as a master device, and so the constitution can be made simpler.

Figure 14:
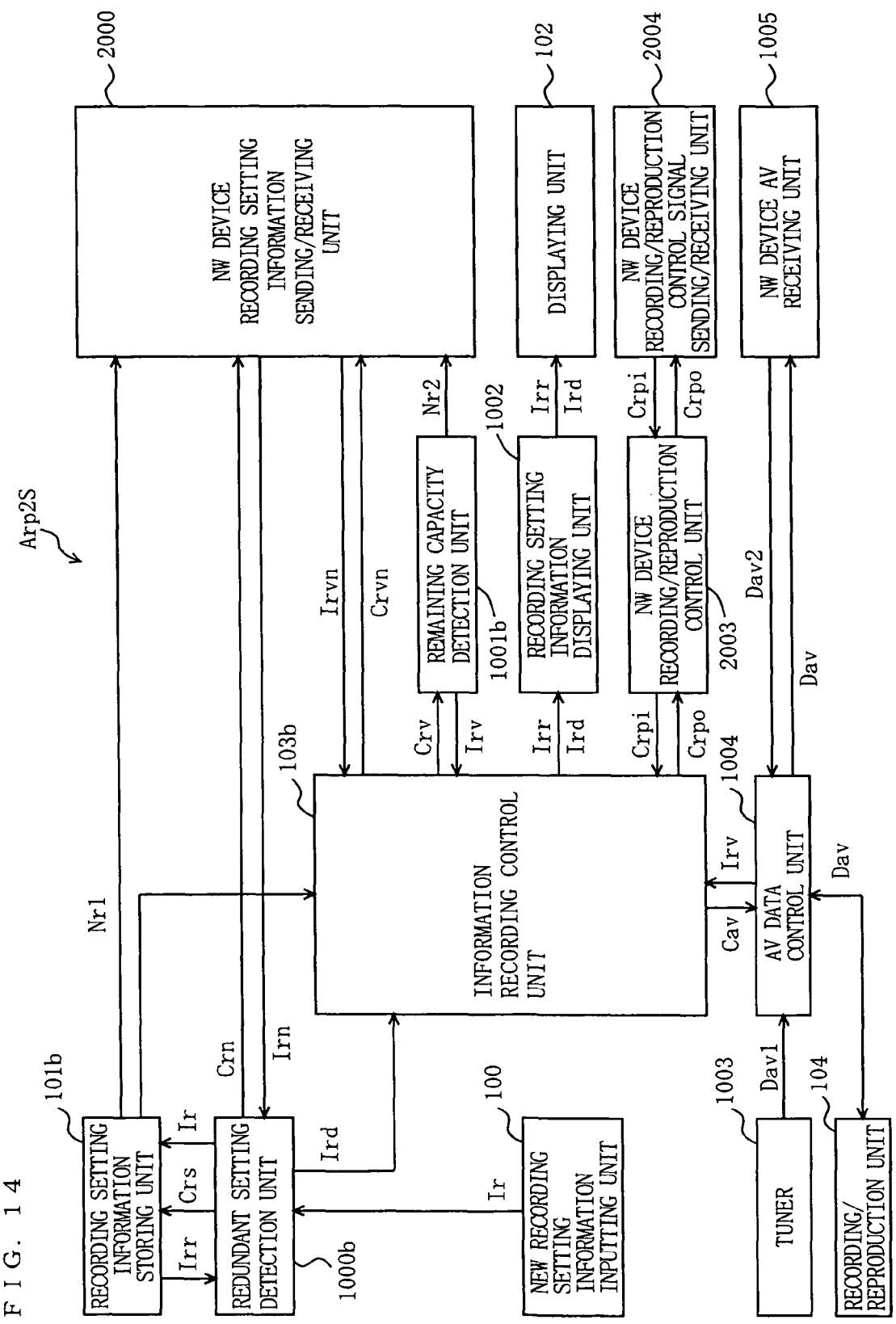
FIG. 14 is a block diagram illustrating necessary constituent elements for the information recording/reproduction apparatus shown in FIG. 10 to function as a slave device.

In FIG. 14, the construction of the information recording/reproduction apparatus Arp2 as a slave device is shown. For distinction from the information recording/reproduction apparatus Arp2 as a master device, the slave device is referred to as an information recording/reproduction apparatus Arp2S. From the information recording/reproduction apparatus Arp2S, the NW device setting information storing unit 2001 and the NW device remaining capacity detection unit 2002 in the information recording/reproduction apparatus Arp2 are removed. This is because, the information recording/reproduction apparatus Arp2S as a slave device does not need to possess external video recording preprogramming information Irn and external remaining capacity information Irvn which are related to other information recording/reproduction apparatus Arp2.

Figure 15:
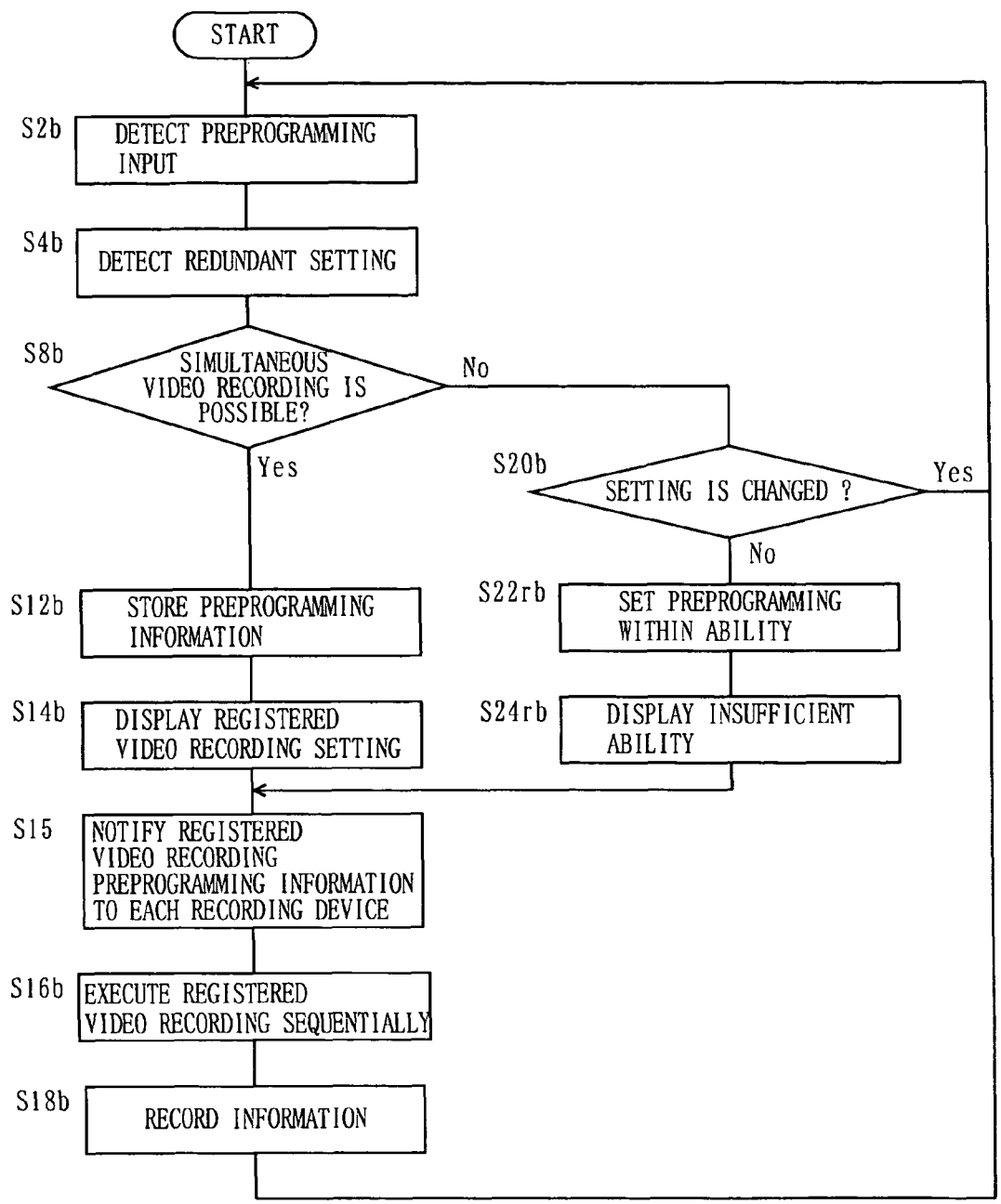
FIG. 15 is a flowchart illustrating a video recording operation of the information recording/reproduction apparatus shown in FIG. 10.

Next, with reference to the flowchart in FIG. 15, a preprogrammed video recording operation of the information recording/reproduction apparatus Arp2S will be described. For conciseness of description, a case where the remaining capacity detection unit 1001b and the NW device remaining capacity detection unit 2002 are removed from the information recording/reproduction apparatus Arp2S is taken as an example and will be described. In this sense, in the flowchart shown in FIG. 15, steps S2, S4, S8, S12, S14, S16, S18, S20, S22r, and S24r in the flowchart shown in FIG. 6, which are directed to the recording/reproduction unit 104 of the information recording/reproduction apparatus Arp1 itself, are respectively replaced with S2b, S4b, S8b, S12b, S14b, S16b, S18b, S20b, S22rb, and S24rb, which are directed also to the recording/reproduction unit 104 of the other information recording/reproduction apparatus Arp2. In other words, in the present embodiment, two setting conditions related to the information recording/reproduction apparatus Arp2 such as the preprogramming data Ir and the external video recording preprogramming information Irn are the processing targets.

Step S15 is added between step S14b and step S16b. At this step, the registered video recording preprogramming information Irr is notified to the other preprogrammed recording device connected to the information recording/reproduction apparatus Arp1. Through this, two or more preprogramming recording devices interconnected to each other can perform preprogrammed video recording in the place of each other.

Figure 16:
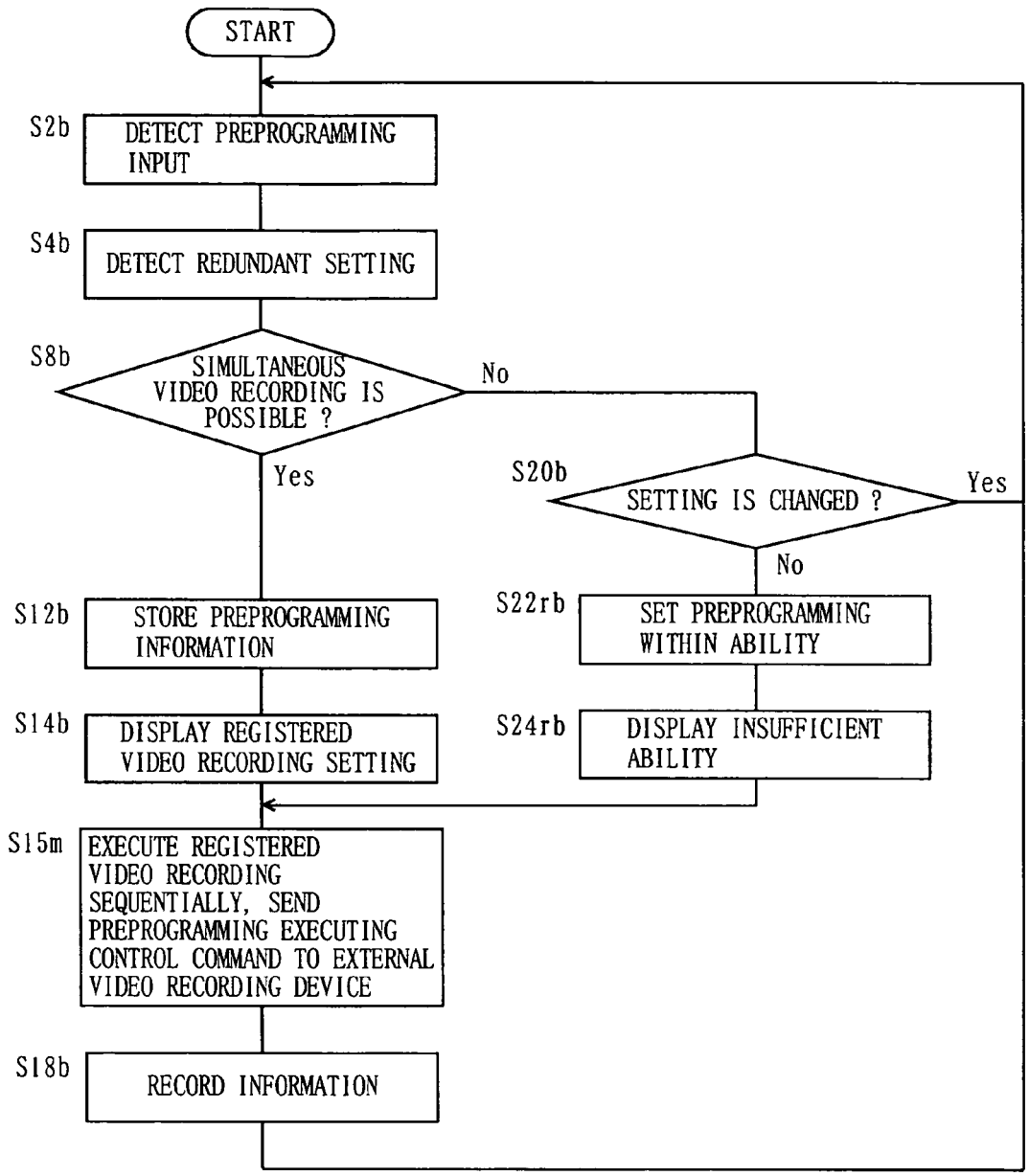
FIG. 16 is a flowchart illustrating a video recording preprogramming operation when the information recording/reproduction apparatus shown in FIG. 10 functions as a master device.

With reference to the flowchart shown in FIG. 16, a preprogrammed video recording operation of the information recording/reproduction apparatus Arp2 as a master device will be described. In this flowchart, step S15 and step S16b shown in the flowchart in FIG. 15 are replaced by step S15m. At step S15m, a preprogrammed video recording which is set in the registered video recording preprogramming information Irr is sequentially executed on the information recording/reproduction apparatus Arp2 itself. In addition, the recording/reproduction instruction output Crpo is transmitted to an external recording device (the information recording/reproduction apparatus Arp2S as a slave device), as a preprogrammed video recording executing command. By this, the information recording/reproduction apparatus Arp2 as master performs preprogrammed recording of information through the use of the recording ability of itself as well as the ability of an external recording device (the information recording/reproduction apparatus Arp2S as slave).

Figure 17:
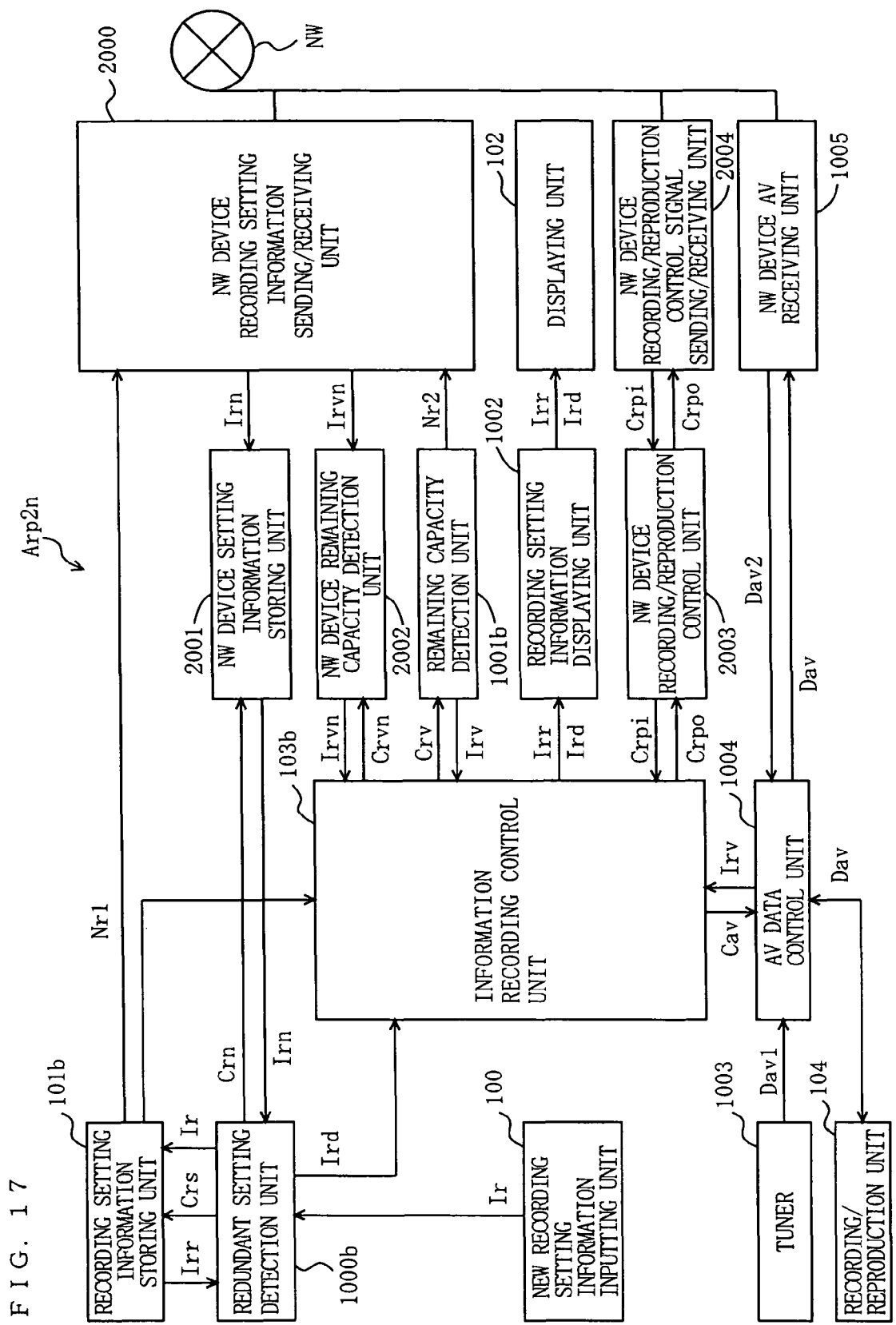
FIG. 17 is a flowchart illustrating a video recording preprogramming operation of the information recording/reproduction apparatus shown in FIG. 14.

In FIG. 17, the construction of the case where the information recording/reproduction apparatus Arp2 is connected to other recording devices via the Internet is displayed. This information recording/reproduction apparatus Arp2n is based on the information recording/reproduction apparatus Arp2 shown in FIG. 10, with the NW device recording setting information sending/receiving unit 2000, the NW device recording/reproduction control signal sending/receiving unit 2004, and the NW device AV receiving unit 1005 being connected to a public circuit network NW. Through this public circuit network NW, the external remaining capacity information Irvn, the external video recording preprogramming information Irn of an external recording device, the recording/reproduction instructing input Crpi, the recording/reproduction instruction output Crpo, and AV data Dav are exchanged in order to perform preprogrammed recordings in the place of each other.

Figure 18:
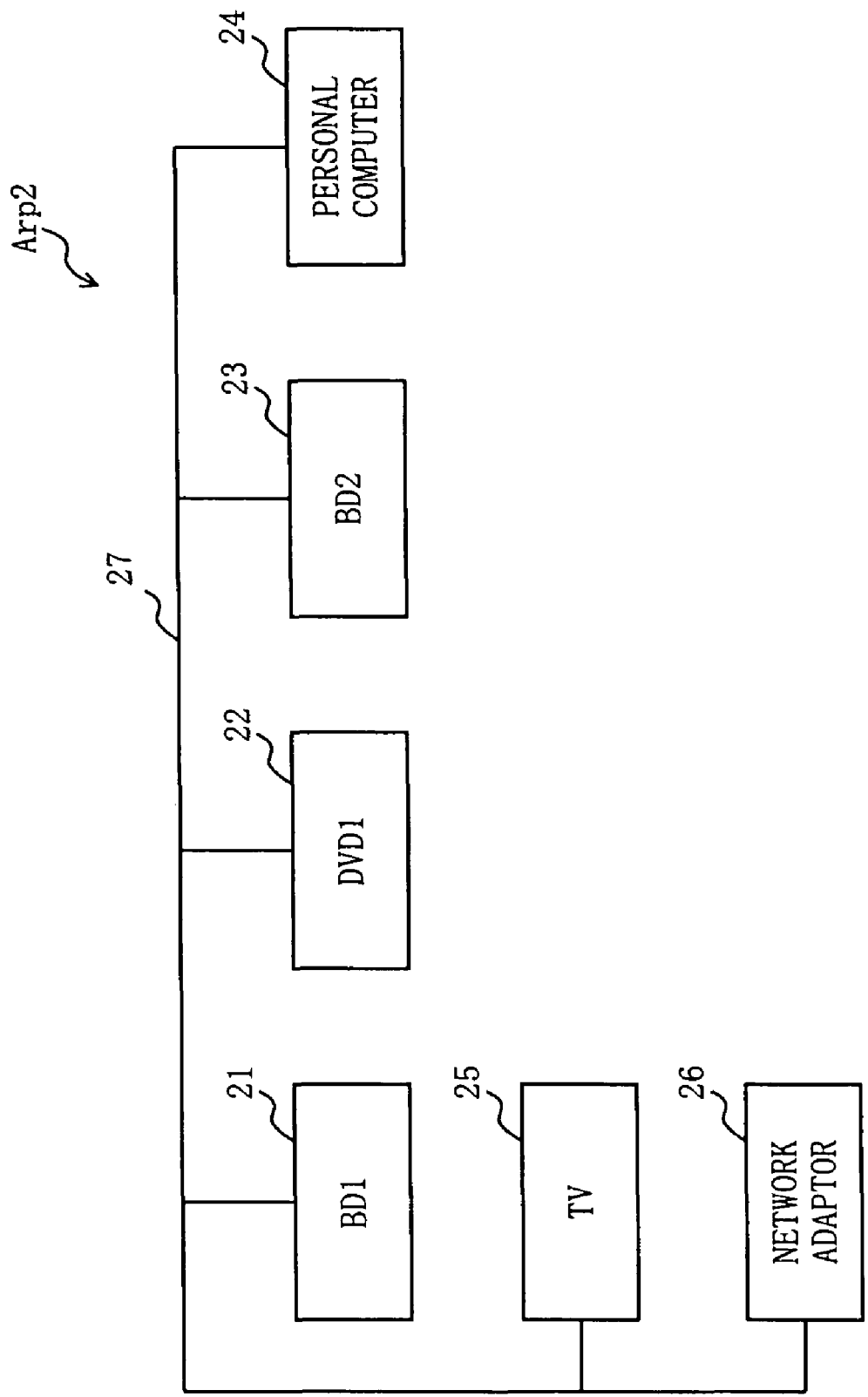
FIG. 18 is a schematic diagram showing the constitution of information recording/reproduction apparatus shown in FIG. 10.

In FIG. 18, an example of the specific construction of the information recording/reproduction apparatus Arp2 in which a plurality of recording devices are interconnected via a network as mentioned above is schematically shown. The information recording/reproduction apparatus Arp2 is preferably constructed from a plurality of video recording/reproduction devices which are connected to a television device 25 via a network. The television device 25 (denoted as "TV" in FIG. 18) is connected to two Blu-ray disk recorders 21 and 23 (denoted as "BD1" and "BD2" in FIG. 18) via a communication network 27. Further, a DVD recorder 22 (denoted as "DVD1" in FIG. 18) and a personal computer 24 are similarly connected to the television device 25.

In this case, preferably, the constitution is arranged so that the personal computer 24 functions as a master device and other devices function as slave devices.

Further, a network adaptor 26 for connection to the external Internet is also connected to the television device 25. The communication network 27 may utilize connection via Ethernet, optical fibers, a wireless and coaxial cable LAN or the like, an IEEE1394 interface device, or a modem. In addition, external connection for the network adaptor 26 may be telephone lines, ADSL, other DSLs, FTTH (optical fibers), CATV, wireless telephones such as mobile telephones or PHS, or power lines.

For the information recording/reproduction apparatus Arp2 and a video recording device, devices capable of video recording such as a DVD recorder, a Blu-ray disk recorder, a hard disk recorder, a videotape recorder, a personal computer, and the like may be used. As a video recording medium, any recording medium may be used, e.g., optical disks such as a DVD-RAM, a DVD-R, a DVD-RW, a DVD+R, a DVD+RW, a Blu-ray Disc, a Video-CD, a hard disk, any type of memory card such as a SD card, and videotapes such as D-VHS, S-VHS and DV.

As aforementioned, the information recording/reproduction apparatus according to the second embodiment has following features in addition to the features of the information recording/reproduction apparatus according to the first embodiment.

With each device, there is provided a desirable effect in that through a simultaneous operation of video recording devices in a hybrid device comprising a plurality of video recording devices, a plurality of redundant preprogrammings can be made. Further, even with a device comprising only one video recording device, through realizing a plurality of data recordings by a parallel processing operation based on an effective data writing algorithm by which, for example, an optical disk pick up capable of RAM operation and a magnetic head of a hard disk operates quickly, and through enhancing the performance of the video recording device thereby, a plurality of redundant preprogrammings can be made.

Additionally, with such a device comprising a plurality of video recording devices, a conventional table format by video recording preprogramming methods is quite difficult to view. Further, conventional video recording preprogramming methods using an electronic program table allow a preprogramming on a program-by-program basis but do not allow free time settings or preprogramming for a plurality of devices. With preprogramming settings of a date-and-time basis schedule, there is provided a desirable effect in that an operational state of a device can be grasped faster, rather than with a listing of programs provided by an electronic program table.

By displaying each video recording device among a plurality of video recording devices and the number of simultaneously recordable instances on video recording devices which are capable of performing a plurality of simultaneous recordings are possible within each preprogramming table, and by enabling setting thereof, there is provided a desirable effect in that: a video recording preprogramming state may be easily grasped at a glance; plural program simultaneous video recording functions possessed by the device may be used to its full potential; and useless redundant program video recording preprogrammings are eliminated.

By displaying within a preprogramming table, a plurality of video recording devices interconnected to a network, there is provided a desirable effect in that a program video recording preprogramming state may be easily grasped at a glance. In addition, through putting video recording preprogramming settings and video recording preprogramming settings of a plurality of video recording devices under a collective management by interconnecting a plurality of devices, an effective video recording preprogramming setting without leaks or redundancy can be performed, even in the case where it is desirable to make a plurality of video recording preprogramming settings in the same time slot due to there being more and more channels, including analog broadcasts, as digital broadcasts gain more prevalence.

Further, aforementioned settings may be performed from one device or from a personal computer connected to a network. Alternatively, they may be performed through accessing the network from outside via the Internet or the like using an external personal computer, a portable information terminal, a cellular phone, or a wired telephone. As a result, there is provided a desirable effect in that even when a forgotten program video recording preprogramming is noticed outside or a new program to videorecord occurs, a program video recording preprogramming setting is possible.

There is provided a desirable effect in that, by setting program setting information for a desired preprogramming, a video recording preprogramming setting can be automatically performed to the optimum video recording device given the video recording setting state of a video recording device connected to a network; and a program video recording preprogramming setting is easily performed without thinking in detail.

By automatic program video recording preprogramming re-setting, in the case where an additional program setting information is difficult to realize under the present setting state of each device, there is provided a desirable effect in that a video recording preprogramming setting may be reconstructed in such a manner that a processing load which arises from a combination of a program and a video recording device selection and hardware resource distribution based on the remaining capacity and the like are optimized.

By an automatic program video recording preprogramming setting, there is provided a desirable effect in that, if, at minimum, a video recording date setting, a video recording start time setting, a video recording end time setting, and a broadcasting channel setting are set at a new video recording preprogramming setting, the device and the system automatically perform the optimum video recording preprogramming.

By an automatic alarm notice, in the case where a medium is not inserted to a tray when a time to execute a video recording preprogramming for a removable medium approaches or the remaining amount of the medium or similarly that of a hard disk video recording device is not enough, there is provided a desirable effect in that an alarm may be displayed or an alarm mail may be sent to other network connected devices or a personal computer or to an external cellular phone or a personal computer so as not to fail in an important program video recording preprogramming.

In addition to the aforementioned, through automatic diversion at the time of error, there is provided a desirable effect in that a program video recording preprogramming setting is automatically changed to another video recording device medium or to a medium of another device.

There is provided a desirable effect in that, if the medium is capable of being reproduced, then those whose execution has been completed can be selected and executed from a video recording preprogramming setting indication. Further, those which are under execution can be simultaneously reproduced during video recording, and a reproduction, a deletion, and a dubbing while designating a device and a video recording device on a pop-up menu, are also possible.

The present invention may be used for preprogrammed video recordings and the like which, among a plurality of recording devices connected via a network, make an effective use of unused resource in each other through performing a preprogrammed video recording in the place of each other.

The invention claimed is:

1. An information recording/reproduction apparatus for performing a preprogrammed recording (i) of information distributed at a predetermined time from a predetermined distribution source (ii) to an information recording medium, and (iii) based on information indicating preprogrammed recording settings determined before the predetermined time of distribution, the information recording/reproduction apparatus comprising:

preprogrammed recording reception means for receiving, as the information indicating the preprogrammed recording settings, a date of distribution, a time of distribution, an identification of a distribution source of the distributed information, and an identification of the information recording medium for performing the preprogrammed recording of the distributed information;

recording control means for causing the distributed information to be recorded on the identified information recording medium, the distributed information being recorded based on the received information indicating the preprogrammed recording settings; and displaying control means for incorporating the received information indicating the preprogrammed recording settings into a two-dimensional matrix defined by the date of distribution, the time of distribution, and a plurality of different information recording mediums capable of having multiple video recordings simultaneously recorded thereto, the plurality of information recording mediums including the identified information recording medium, and the two-dimensional matrix having a plurality of divided areas, each divided area of the plurality of divided areas having a respective date of distribution assigned thereto, such that each divided area of the plurality of divided areas represents the respective date of distribution assigned thereto and for displaying on a displaying unit a display screen indicating the two-dimensional matrix having incorporated therein the information indicating the preprogrammed recording settings, wherein, when a plurality of pieces of the information indicating the preprogrammed recording settings are incorporated into the two-dimensional matrix, the plurality of pieces of the information indicating the preprogrammed recording settings are respectively incorporated into the plurality of divided areas of the two-dimensional matrix based on the respective date of distribution represented by each respective divided area of the plurality of divided areas and indicated by a respective piece of the information indicating the preprogrammed recording settings.

2. The information recording/reproduction apparatus according to claim 1, further comprising a preprogramming setting redundancy displaying means for, when two pieces of the information indicating the preprogrammed recording settings are redundant with respect to a portion of the date of distribution and the time of distribution, displaying an alarm showing that the two pieces information indicating the preprogrammed recording settings are redundant.

3. The information recording/reproduction apparatus according to claim 2, wherein the preprogramming setting redundancy displaying means causes the alarm to be displayed by altering one of a display design and a displaying color.

4. The information recording/reproduction apparatus according to claim 3, wherein the preprogramming setting redundancy displaying means displays a number of the pieces of the information indicating the preprogrammed recording settings that are redundant.

5. The information recording/reproduction apparatus according to claim 1, further comprising executing preprogrammed recording setting displaying means for displaying, from among the pieces of the information indicating the preprogrammed recording settings, any preprogrammed recording setting having a preprogramming recording that is under execution, in order to distinguish any preprogrammed recording setting having a preprogrammed recording that is not under execution from the preprogramming recording that is under construction.

6. The information recording/reproduction apparatus according to claim 1, further comprising a completed preprogrammed recording setting displaying means for displaying, from among the pieces of the information indicating the preprogrammed recording settings, any preprogrammed recording setting having a preprogrammed recording that is completed, in order to distinguish any preprogrammed recording setting having a preprogrammed recording that is not completed from the preprogramming recording that is completed.

7. The information recording/reproduction apparatus according to claim 1, further comprising automatic preprogrammed recording setting changing means for, in response to an alteration of the time of distribution, altering the information indicating the preprogrammed recording setting by automatically finding an optimum recording control means.

8. The information recording/reproduction apparatus according to claim 1, wherein, when the programmed recording reception means receives the information indicating the preprogrammed recording settings, the displaying control means causes the display unit to display the display screen.

9. The information recording/reproduction apparatus according to claim 1 further comprising:

electronic program table shifting means for shifting to an electronic program table; and electronic program table data setting means for allowing a setting content in an electronic program table to be reflected by executing a preprogrammed selection, and for allowing information data indicating one or more of a program title and stereo in the electronic program table, to be set and recorded.

10. The information recording/reproduction apparatus according to claim 1, further comprising automatic preprogrammed recording setting generation means for selecting an optimum recording control means for information indicating a new preprogrammed recording setting, the selection being based on information indicating an existing preprogrammed recording setting related to the information recording medium.

11. The information recording/reproduction apparatus according to claim 10, wherein the optimum recording control means is connected to a network.

12. The information recording/reproduction apparatus according to claim 1, further comprising automatic recording resetting means for reconstructing the information indicating preprogrammed recording settings, in order to optimize a constraint on hardware arising from a combination of the information recording medium and the recording control means.

13. The information recording/reproduction apparatus according to claim 1, further comprising automatic recording setting means for, in a new preprogrammed recording setting, automatically generating information indicating an optimum preprogrammed recording setting, if the date of distribution, the time of distribution, and the distribution source are received by the preprogrammed recording reception means.

14. The information recording/reproduction apparatus according to claim 1, further comprising preprogrammed recording setting changing means for diverting, when the distributed information is incapable of being recorded properly, a recording destination of the distributed information to another video recording device medium or to a medium of another device.

15. The information recording/reproduction apparatus according to claim 1, further comprising menu means for performing one of a reproduction, a deletion, and a dubbing of distributed information having preprogrammed recording completed.

16. The information recording/reproduction apparatus according to claim 1, further comprising menu means for enabling simultaneous recording and reproduction of distributed information having preprogrammed recording under execution.

17. The information recording/reproduction apparatus according to claim 1, further comprising:
remaining capacity detection means for detecting a recordable capacity of the information recording medium; and
recording capability determining means for displaying an alarm indicating a recording incapability when the detected capacity falls short of a recording time specified by the information indicating the preprogramming settings.

18. The information recording/reproduction apparatus according to claim 17, further comprising preprogrammed recording optimizing means for, when the detected capacity falls short of the recording time specified by the information indicating the preprogramming settings, setting preprogrammed recordings up to a limit of recording that is possible using the detected capacity.

* * * * *